US009164497B2

(12) United States Patent
Cameron et al.

(10) Patent No.: US 9,164,497 B2
(45) Date of Patent: Oct. 20, 2015

(54) RELUCTANCE MOTOR SYSTEM

(71) Applicant: The Boeing Company, Chicago, IL (US)

(72) Inventors: Douglas C. Cameron, Ladera Ranch, CA (US); Christopher Pete Benson, Berkeley, CA (US)

(73) Assignee: THE BOEING COMPANY, Chicago, IL (US)

( * ) Notice: Subject to any disclaimer, the term of this patent is extended or adjusted under 35 U.S.C. 154(b) by 14 days.

(21) Appl. No.: 14/043,612

(22) Filed: Oct. 1, 2013

(65) Prior Publication Data

US 2015/0091491 A1     Apr. 2, 2015

(51) Int. Cl.
| | |
|---|---|
| *H02P 25/08* | (2006.01) |
| *G05B 11/01* | (2006.01) |
| *H02P 6/16* | (2006.01) |
| *H02K 41/06* | (2006.01) |

(52) U.S. Cl.
CPC ............ *G05B 11/011* (2013.01); *H02K 41/065* (2013.01); *H02P 6/16* (2013.01); *H02P 2203/01* (2013.01)

(58) Field of Classification Search
CPC ............... H02K 7/09; H02P 5/00; H02P 5/46; H02P 21/00; H02P 21/06; H02P 21/12; F15B 11/08; F15B 11/16
USPC ........... 310/82, 463, 166; 318/34, 41, 400.01, 318/400.02, 254.1, 701, 400.41, 538, 558
See application file for complete search history.

(56) References Cited

U.S. PATENT DOCUMENTS

| | | | |
|---|---|---|---|
| 2,509,391 A * | 5/1950 | Hansen et al. | 310/163 |
| 3,341,725 A | 6/1967 | Gifford | |
| 5,099,186 A * | 3/1992 | Rippel et al. | 318/803 |
| 6,232,685 B1 | 5/2001 | Swetish et al. | |
| 6,914,420 B2 | 7/2005 | Crocker | |
| 7,194,321 B2 * | 3/2007 | Sun et al. | 318/400.01 |
| 7,453,176 B2 * | 11/2008 | Davison | 310/75 R |
| 8,796,891 B2 * | 8/2014 | Nakamura et al. | 310/67 R |

(Continued)

FOREIGN PATENT DOCUMENTS

| | | |
|---|---|---|
| DE | 1788145 A1 | 5/1973 |
| DE | 19754921 A1 | 6/1999 |

(Continued)

OTHER PUBLICATIONS

Cameron, "Quadrant Change Control in Brushless DC Motors," U.S. Appl. No. 13/933,803, filed Jul. 2, 2013, 82 pages.

(Continued)

*Primary Examiner* — Bentsu Ro
(74) *Attorney, Agent, or Firm* — Yee & Associates, P.C.

(57) ABSTRACT

A method and apparatus for controlling operation of an electric motor. A controller is configured to identify a position of a disc relative to a plate with coils physically associated with the plate. The controller is further configured to control a current sent to the coils based on the position of a disc. The disc is configured to move such that a closest point between the disc and the plate changes along a periphery of the disc.

26 Claims, 18 Drawing Sheets

(56) References Cited

U.S. PATENT DOCUMENTS

| | | | |
|---|---|---|---|
| 2002/0036435 A1* | 3/2002 | Ooyama et al. | 310/90.5 |
| 2005/0031322 A1* | 2/2005 | Boyle et al. | 388/800 |
| 2008/0034956 A1* | 2/2008 | Ochi et al. | 91/420 |
| 2008/0084171 A1* | 4/2008 | Leehey et al. | 318/34 |
| 2009/0009011 A1* | 1/2009 | Edelson et al. | 310/48 |
| 2011/0290353 A1* | 12/2011 | Fukui et al. | 137/565.11 |
| 2012/0005840 A1* | 1/2012 | Jang et al. | 8/137 |
| 2012/0074876 A1* | 3/2012 | Redler | 318/41 |

FOREIGN PATENT DOCUMENTS

| | | |
|---|---|---|
| DE | 10028964 A1 | 1/2002 |
| EP | 0565746 A1 | 10/1993 |

OTHER PUBLICATIONS

International Search Report and Written Opinion, dated Jun. 12, 2015, regarding Application No. PCT/US2014/046545, 11 pages.

* cited by examiner

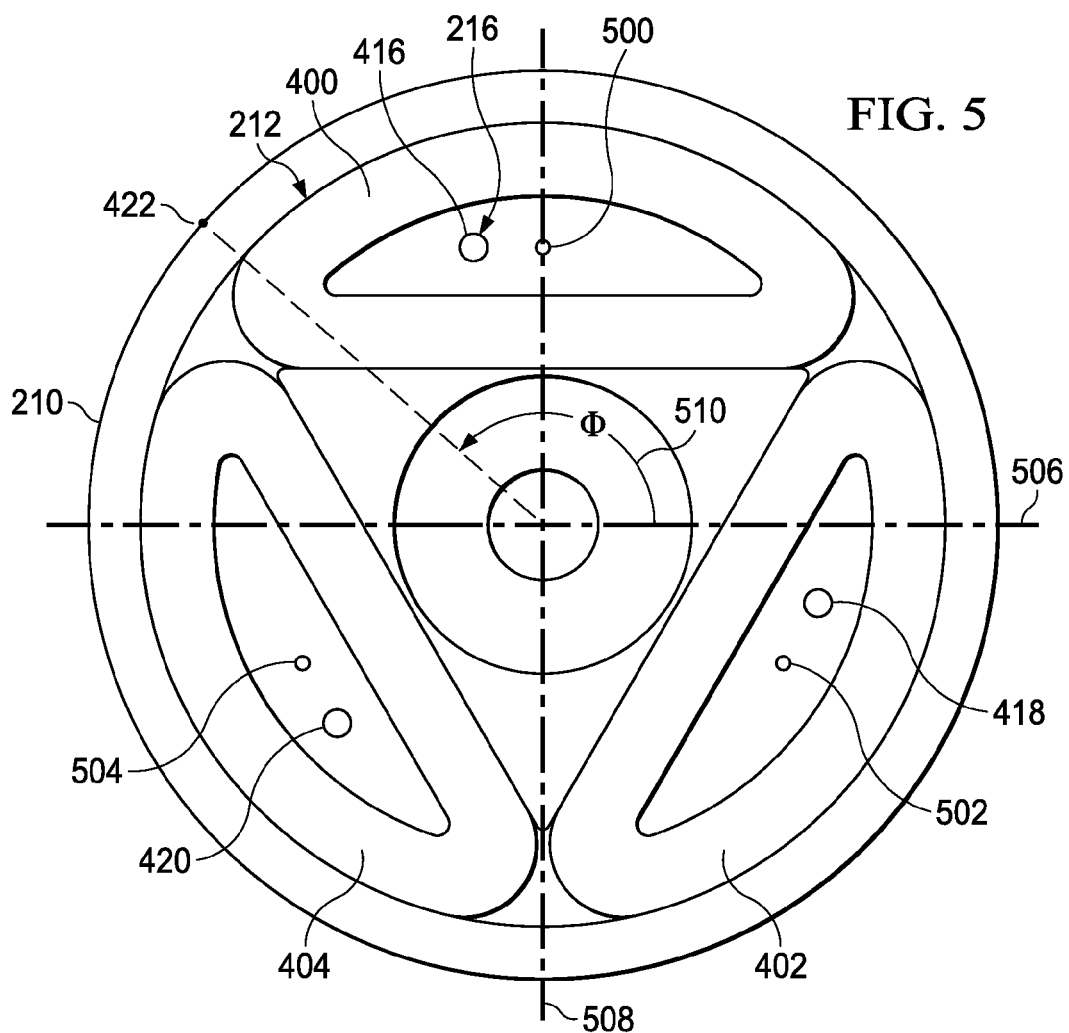

| CONDITION | DUTY CYCLE STATE |
|---|---|
| $i_{fb} < i_{LL}$ | INCREASE CURRENT (100% DC) |
| $i_{fb} > i_{LL}$ & $i_{fb} < i_{UL}$ & $d(i_{fb})/dt > 0$ | INCREASE CURRENT (100% DC) |
| $i_{fb} > i_{LL}$ & $i_{fb} < i_{UL}$ & $d(i_{fb})/dt < 0$ | COAST DECAY (0% DC) |
| $i_{fb} > i_{UL}$ | REGEN BRAKE (-100% DC) |

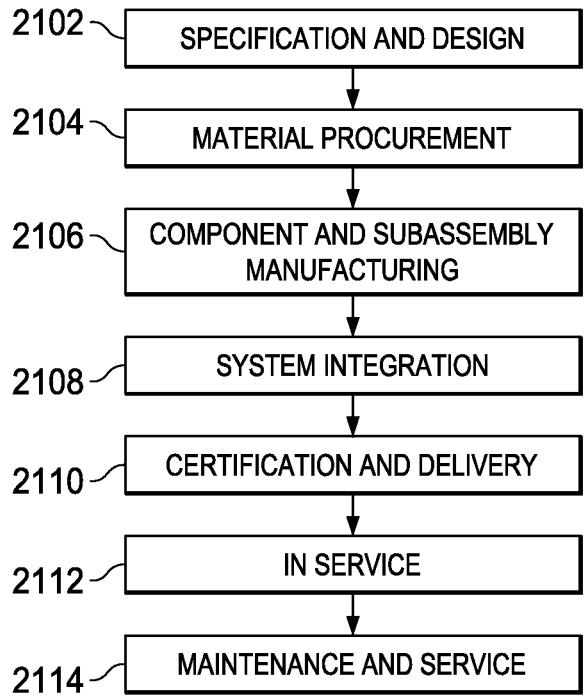
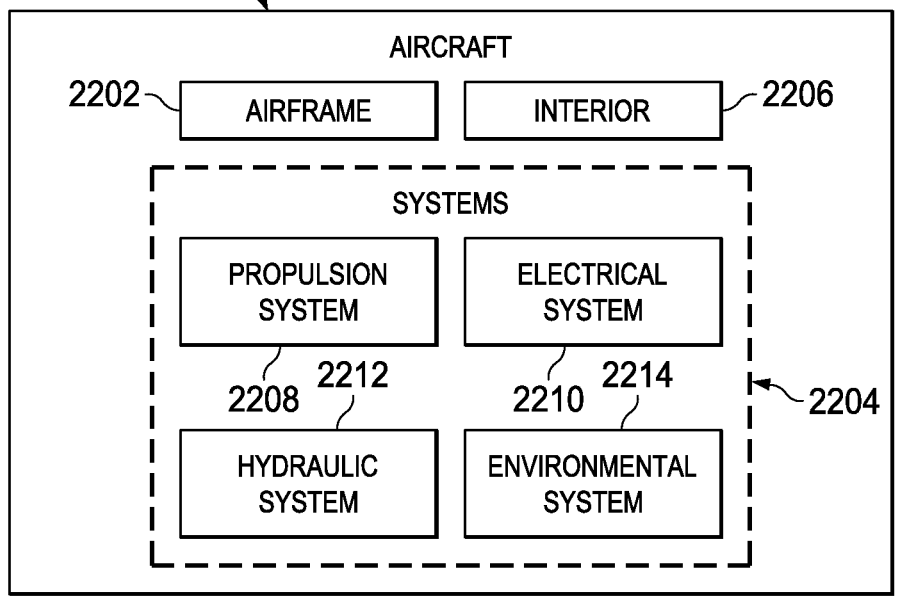

RELUCTANCE MOTOR SYSTEM

BACKGROUND INFORMATION

1. Field

The present disclosure relates generally to electric motor systems and, in particular, to controlling electric motor systems. Still more particularly, the present disclosure relates to a method and apparatus for controlling a reluctance motor system.

2. Background

An electric motor is a device that converts electrical power into mechanical power. Electric motors are used for various applications. These applications include fans, pumps, tools, disc drives, drills, and other types of devices that may be found in these and other types of platforms.

One type of electric motor is a reluctance motor. A reluctance motor may be, for example, an asynchronous reluctance motor, a variable reluctance motor, a switched reluctance motor, a variable reluctance stepping motor, or some other similar type of motor.

These types of motors may provide a desired level of power density for a desired cost. A reluctance motor may provide an ability to hold positions with a desired level of accuracy. A reluctance motor also may provide a desired level of torque with a smaller size in addition to positioning accuracy as compared to other types of electric motors. These types of motors may be ideal for various applications. For example, the reluctance motor may be used to move aerodynamic control surfaces of an aircraft into position. For example, reluctance motors may be used to move stabilizers, rudders, flaps, ailerons, and other suitable control surfaces into a desired position. Additionally, the reluctance motor also may be used for propulsion of an aircraft.

Although a variable reluctance motor may provide a desired level of torque and positioning accuracy, managing movement of a reluctance motor with a desired level of smoothness may be more difficult than desired. Therefore, is would be desirable to have a method and apparatus that take into account at least some of the issues discussed above, as well as other possible issues.

SUMMARY

In one illustrative embodiment, an apparatus comprises a controller configured to identify a position of a disc relative to a plate with coils physically associated with the plate. The controller is further configured to control a current sent to the coils based on the position of a disc. The disc is configured to move such that a closest point between the disc and the plate changes along a periphery of the disc.

In another illustrative embodiment, an electric motor system comprises an electric motor and a controller. The electric motor has a plate with coils physically associated with the plate and a disc configured to move such that a closest point between the disc and the plate changes along a periphery of the disc. The controller is configured to identify a position of the disc relative to a plate based on inductance measured for the coils. The controller is further configured to control a current sent to the coils based on the position of the disc.

In yet another illustrative embodiment, a method for controlling operation of an electric motor is provided. A position of a disc is identified relative to a plate with coils physically associated with the plate. A current sent to the coils is controlled based on the position of the disc. The disc is configured to move such that a closest point between the disc and the plate changes along a periphery of the disc.

In another illustrative embodiment, a system comprises a hydraulic motor system, a reluctance motor system, and a controller associated with the electric motor. The reluctance motor system operates as a booster for the hydraulic motor system. The controller is configured to identify a position of a disc relative to a plate with coils physically associated with the plate. The controller is further configured to control a current sent to the coils based on the position of the disc.

In yet another illustrative embodiment, an electric motor system comprises a first controller associated with a first electric motor and a second controller associated with a second electric motor. The first controller is configured to identify a position of a first disc relative to a first plate with first coils physically associated with the first plate. The first controller is further configured to control a current sent to the first coils based on the position of the first disc. The second controller is configured to identify a position of a second disc relative to a second plate with second coils physically associated with the second plate. The second controller is further configured to control a current sent to the second coils based on the position of the second disc. The first controller and the second controller are configured to operate in parallel.

In still another illustrative embodiment, an electric motor system comprises a controller and an electric motor associated with the controller. The controller is configured to identify a position of a disc relative to a plate with coils physically associated with the plate. The controller is further configured to control a current sent to the coils based on the position of the disc. The controller is further configured to receive a commanded rotor arm position, identify a current rotor arm position, and generate a rate command for the disc.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 5 is an illustration of a top side of a plate in accordance with an illustrative embodiment;

FIG. 6 is an illustration of equations for identifying a position of a disc in accordance with an illustrative embodiment;

FIG. 21 is an illustration of a block diagram of an aircraft manufacturing and service method in accordance with an illustrative embodiment; and FIG. 22 is an illustration of a block diagram of an aircraft in which an illustrative embodiment may be implemented.

DETAILED DESCRIPTION

Figure 1:
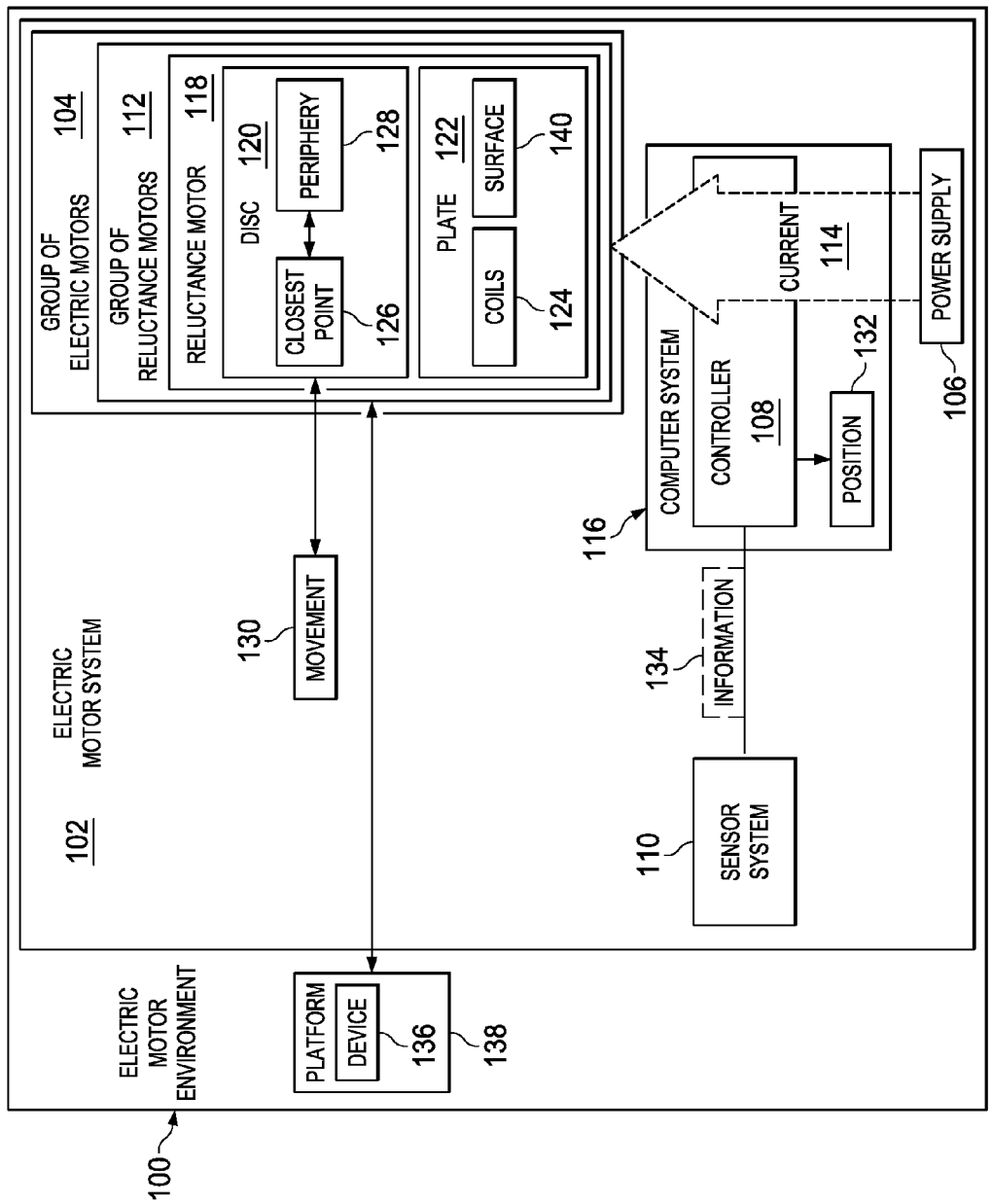
FIG. 1 is an illustration of a block diagram of an electric motor environment in accordance with an illustrative embodiment.

The illustrative embodiments recognize and take into account a number of considerations. For example, the illustrative embodiments recognize and take into account that one type of reluctance motor in which smooth movement of the electric motor may be desirable is a virtual ellipse device (VED). With this type of electric motor, a disc is mounted on a pole relative to a plate with coils.

The illustrative embodiments recognize and take into account that the position of the disc may move relative to the plate with coils based on a current in the coils. For example, the disc may move such that the closest point of the periphery of the disc changes position in response to changes in a current sent to the coils. This type of movement may be a nutating motion in which rotation of the disc does not occur.

The illustrative embodiments recognize and take into account that the position of the disc may be used to send current to the coils to provide a desired motion of the disc. The illustrative embodiments also recognize and take into account that one manner in which the position of the disc may be identified is through simulations that identify timing for position of the disc. In other words, these simulations may identify where, relative to the plate with coils, the closest point of the periphery of the disc is expected for a given point in time during operation of the virtual ellipse device. Based on these simulations, commands may be generated for sending current to the coils to move the disc. This type of solution, however, does not take into account that environmental factors may change the timing or manner in which the virtual ellipse device operates. As a result, the operation of the motor may not be as smooth as desired.

Thus, the illustrative embodiments provide a method and apparatus for controlling an electric motor with a disc that has a periphery with a closest point that changes during operation of the electric motor. The apparatus includes a controller. The controller is configured to identify a position of the disc relative to a plate with coils physically associated with the plate and control a current sent to the coils based on the position of the disc. The disc is configured to move such that a closest point between the disc and the plate changes along a periphery of the disc.

The illustrative embodiments also recognize and take into account that identifying the position of the disc with a desired level of accuracy may be more difficult than desired. As a result, the movement may not be as smooth as desired if the accuracy in identifying the position of the disc is not as great as desired. Thus, in the illustrative embodiments, the position of the disc may be identified based on inductance of the coils. The inductance may be measured during operation of the electric motor. Further, the position may be identified during operation of the electric motor rather than through predicting the position based on time from simulations. The position may be identified using measurements, calculations, or both during the operation of the electric motor.

With reference now to figures and, in particular, with reference to FIG. 1, an illustration of a block diagram of an electric motor environment is depicted in accordance with an illustrative embodiment. Electric motor environment 100 is an example of an environment in which an illustrative embodiment may be implemented.

As depicted, electric motor environment 100 includes electric motor system 102. As depicted, electric motor system 102 includes group of electric motors 104, power supply 106, controller 108, and sensor system 110. Different types of motors may be present in group of electric motors 104. For example, an electric motor in group of electric motors 104 may be selected from one of a reluctance motor, a variable reluctance motor, a virtual ellipse device, or other suitable types of motors. In this illustrative example, group of electric motors 104 may be direct current (DC) electric motors.

As illustrated, group of electric motors 104 takes the form of group of reluctance motors 112. A "group of," as used herein with reference to items, means one or more items. For example, group of electric motors 104 is one or more electric motors.

Power supply 106 supplies current 114 to group of electric motors 104 through controller 108. Power supply 106 may take various forms. For example, power supply 106 may be selected from at least one of a battery, a power supply unit that converts alternating current to direct current, an electric generator, or some other suitable component.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A, one of item B, and ten of item C; four of item B and seven of item C; and other suitable combinations. The item may be a particular object, thing, or category. In other words, at least one of means any combination of items and number of items may be used from the list but not all of the items in the list are required.

Controller 108 is a hardware device in these illustrative examples. Controller 108 may include software. The hardware may include circuits that operate to perform the operations in controller 108.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

Controller 108 may be implemented in computer system 116. Computer system 116 may include one or more computers. When more than one computer is present in computer system 116, these computers may be in communication with each other over a communications medium such as a network.

In this illustrative example, controller 108 is configured to control operation of group of electric motors 104. In particular, controller 108 may control reluctance motor 118 within group of reluctance motors 112. Reluctance motor 118 is an electric motor in this example.

As depicted, reluctance motor 118 comprises disc 120, plate 122, and coils 124. In this illustrative example, coils 124 are physically associated with plate 122.

When one component is "physically associated" with another component, the association is a physical association in the depicted examples. For example, a first component, such as coils 124, may be considered to be physically associated with a second component, such as plate 122, by being secured to the second component, bonded to the second component, mounted to the second component, welded to the second component, fastened to the second component, and/or connected to the second component in some other suitable manner. The first component also may be connected to the second component using a third component. The first component may also be considered to be physically associated with the second component by being formed as part of the second component, extension of the second component, or both.

In this illustrative example, disc 120 is a physical structure. Disc 120 may have a cross-section that has a circular shape, an elliptical shape, or some other suitable shape. A three-dimensional shape for disc 120 may be, for example, ellipsoid, hemisphere, or some other suitable three-dimensional shape.

Also, disc 120 is configured to have closest point 126 relative to plate 122. Closest point 126 may be along periphery 128 of disc 120 relative to surface 140 of plate 122. In some illustrative examples, closest point 126 may be a point between disc 120 and plate 122 where contact between the two components occurs and, in other illustrative examples, contact between the two components does not occur at closest point 126.

Disc 120 may be comprised of a number of different materials that interact with the magnetic field in coils 124. In the illustrative example, disc 120 may include any material having a permeability configured to support the formation of a magnetic field within itself in which the magnetic field has a desire level. For example, disc 120 may be comprised of a ferromagnetic material. The material for disc 120 may be selected from materials such as iron, nickel, cobalt, metal alloys containing one or more of these materials, and other suitable materials.

Disc 120 is configured to move such that closest point 126 between disc 120 and plate 122 changes along periphery 128 of disc 120. In the illustrative example, movement 130 of disc 120 is generated through controlling current 114 sent to coils 124 in reluctance motor 118. Disc 120 may take the form of a wobble plate in some illustrative examples.

As depicted, controller 108 is configured to identify position 132 of disc 120 relative to plate 122 with coils 124 physically associated with plate 122. Further, controller 108 is configured to control current 114 sent to coils 124 based on position 132. This control results in disc 120 moving such that closest point 126 between disc 120 and plate 122 changes along periphery 128 of disc 120.

In this illustrative example, disc 120 moves with a nutating motion. This nutating motion may be a wobbling of disc 120 to change closest point 126 without rotating disc 120.

With the identification of position 132, controller 108 may control current 114 sent to coils 124 such that movement 130 of disc 120 occurs. The control may be such that movement 130 may be at least one of smooth, stepped, or some other type of desired movement for disc 120.

In the illustrative example, position 132 is identified using sensor system 110. Sensor system 110 is a hardware system and may include software. As depicted, sensor system 110 is configured to generate information 134 about position 132 of disc 120. In the illustrative example, sensor system 110 may be comprised of at least one of an inductance sensor, an encoder, a Hall effect sensor, a laser range finder, a camera, a distance sensor, a current sensor, or some other suitable type of sensor.

Information 134 may take various forms. For example, information 134 may include measurements used to calculate position 132 or other suitable types of information.

For example, information 134 may include inductance measured for coils 124. As a result, information 134 may be used by controller 108 to identify position 132 of disc 120 relative to plate 122 with coils 124 physically associated with plate 122 based on the inductance measured for coils 124 by sensor system 110. In other illustrative examples, sensor system 110 may calculate position 132 from the measurement of inductance in coils 124 and send position 132 as information 134 that is identified by controller 108.

When position 132 is identified with a desired level of accuracy, current 114 may be controlled such that movement 130 has a desired movement such as a smooth movement. In this manner, reluctance motor 118 may be connected to device 136 in platform 138. Reluctance motor 118 may move at least one of device 136 or a group of components in device 136.

Device 136 may take different forms. For example, device 136 may be selected from one of an aerodynamic control surface, a propeller, a wheel, and some other suitable device. Platform 138 also may take different forms. For example, platform 138 may be selected from one of a mobile platform, a stationary platform, a land-based structure, an aquatic-based structure, a space-based structure, an aircraft, an unmanned aerial vehicle, drilling equipment, an electric crane, a windmill, a winch, a surface ship, a tank, a personnel carrier, a train, a spacecraft, a space station, a satellite, a submarine, an automobile, a power plant, a bridge, a dam, a house, a manufacturing facility, a building, a robot, a robotic arm, an electric propulsion system, and some other suitable type of platform.

The illustration of electric motor environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, controller 108 may be further configured to identify a second position of a second disc relative to a second plate with second coils physically associated with the second plate and control the current sent to the second coils based on the second position of the second disc. These components may be located in another electric motor in group of electric motors 104.

In this illustrative example, plate 122 and coils 124 are shown as separate functional components. In other illustrative examples, these two functional components may be implemented as a single physical structure in which coils 124 are integrated with plate 122.

Figure 2:
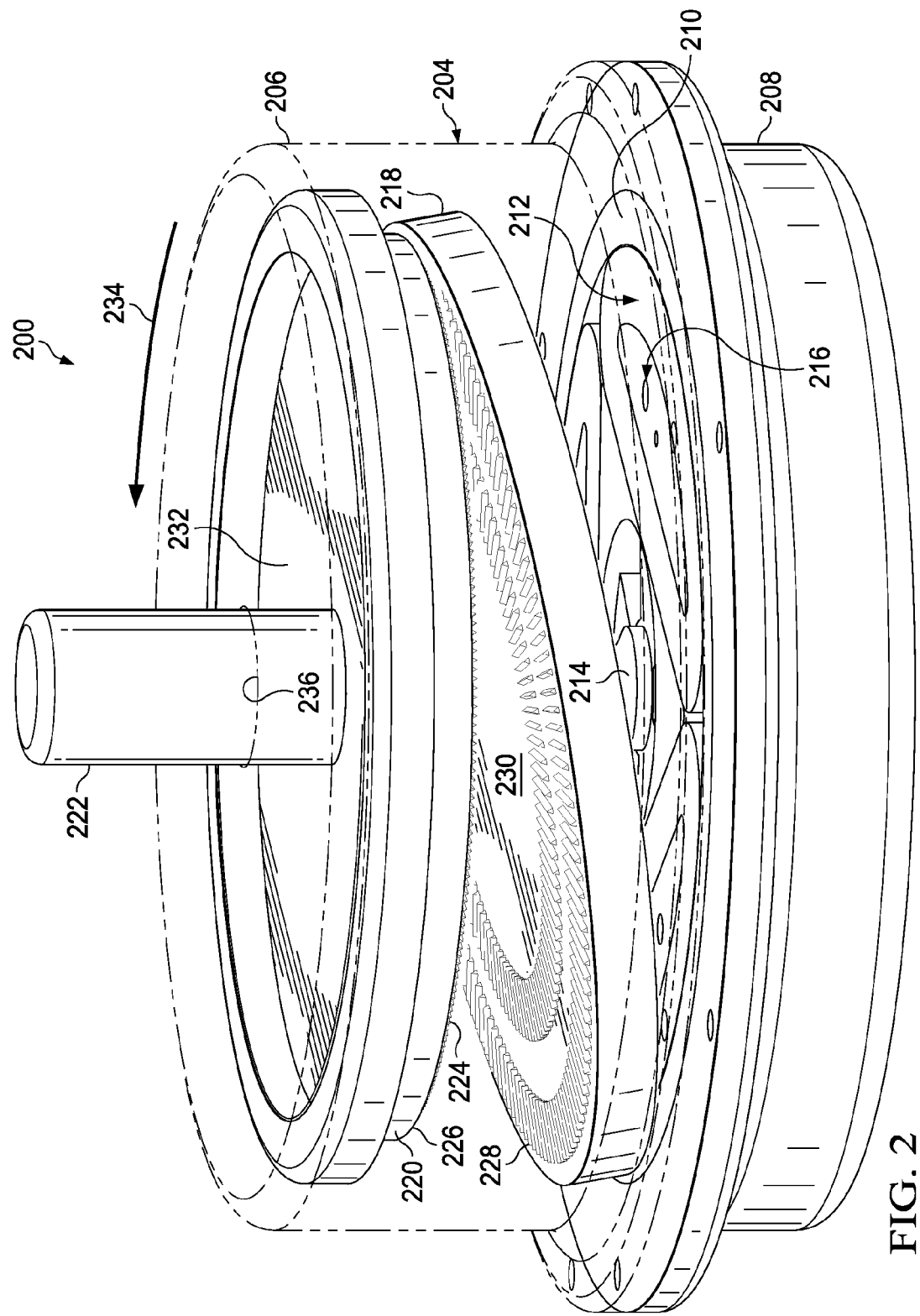
FIG. 2 is an illustration of a reluctance motor in accordance with an illustrative embodiment.

With reference next to FIG. 2, an illustration of a reluctance motor is depicted in accordance with an illustrative embodiment. In this illustration, reluctance motor 200 is an example of an implementation for reluctance motor 118 shown in block form in FIG. 1. In this particular example, reluctance motor 200 is a virtual ellipse device.

Reluctance motor 200 includes housing 204. Housing 204 has first part 206 and second part 208. First part 206 is shown in phantom to provide a view of other components located within housing 204. As can be seen in this view, reluctance motor 200 also includes plate 210, coils 212, post 214, sensors 216, disc 218, rotor 220, and shaft 222.

As can be seen in this view, coils 212 and sensors 216 are physically associated with plate 210. Post 214 extends from plate 210 and supports disc 218.

Coils 212 are an example of a physical implementation of coils 124 shown in block form in FIG. 1. In this illustrative example, coils 212 may be a number of coils. A "number of," as used herein, means one or more. For example, a number of coils 212 is one or more of coils 212.

Current may be sent to coils 212 to cause movement of disc 218. Sensors 216 are an example of a physical implementation of sensors that may be in sensor system 110 shown in block form in FIG. 1. In this example, sensors 216 are configured to detect inductance of coils 212. Sensors 216 are configured to generate information about the position of disc 218 relative to plate 210 from the inductance detected in coils 212.

Rotor 220 has first teeth 224 on surface 226 that engage second teeth 228 on surface 230 of disc 218. Movement of disc 218 causes movement of rotor 220. In particular, movement of disc 218 causes rotation of rotor 220 in the direction of arrow 234.

Shaft 222 extends from surface 232 of rotor 220 out of opening 236 in first part 206 of housing 204. In the depicted example, shaft 222 is configured to be connected to a device such as an aerodynamic control surface, a propeller, a wheel, or some other suitable device. Reluctance motor 200 also is configured to be connected to a controller such as controller 108 shown in block form in FIG. 1.

Figure 3:
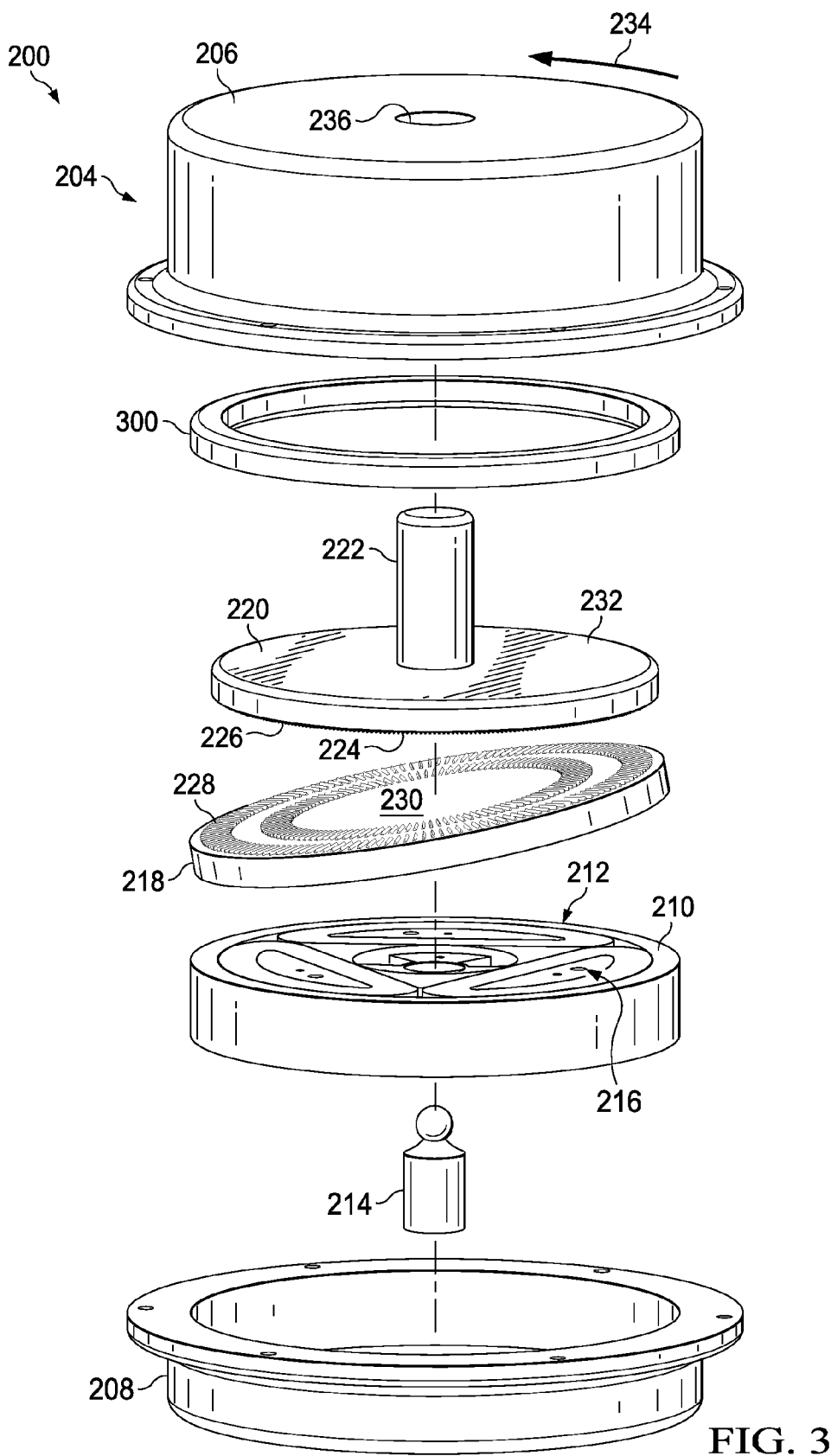
FIG. 3 is an illustration of an exploded view of a reluctance motor in accordance with an illustrative embodiment.

With reference next to FIG. 3, an illustration of an exploded view of a reluctance motor is depicted in accordance with an illustrative example. In this view, bearing 300 for rotor 220 is seen. Bearing 300 is configured to hold rotor 220 in first part 206 of housing 204 such that rotor 220 may rotate in the direction of arrow 234.

Figure 4:
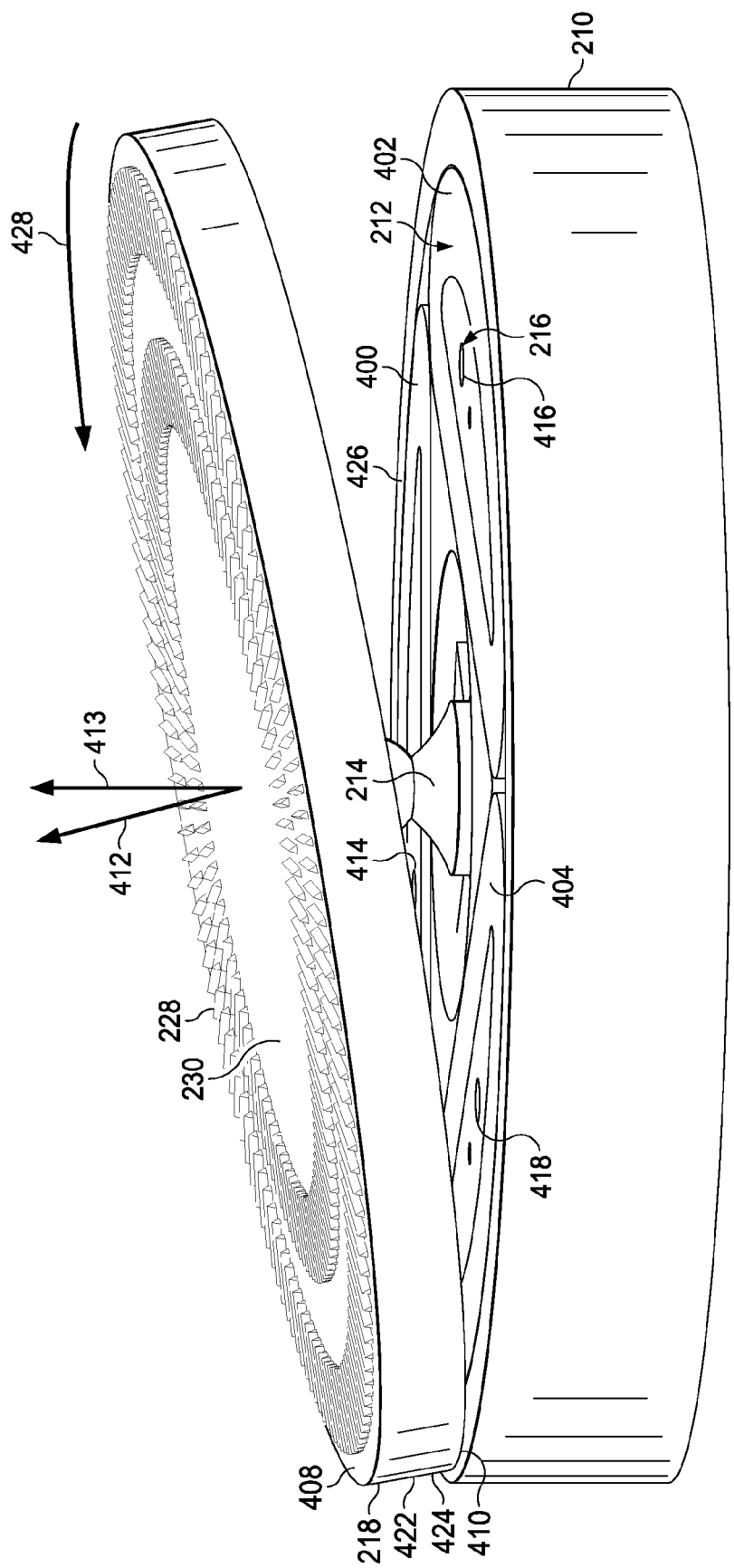
FIG. 4 is an illustration of a disc on a plate in a reluctance motor in accordance with an illustrative embodiment.

Turning now to FIG. 4, an illustration of a disc on a plate in a reluctance motor is depicted in accordance with an illustrative embodiment. In this illustration, disc 218 is shown on post 214 extending from top side 426 of plate 210. Other components are not shown to avoid obscuring an explanation of the positioning of disc 218 relative to plate 210.

In this illustration, coils 212 are physically associated with plate 210. Coils 212 include coil A 400, coil B 402, and coil C 404. A current may be sent to coil A 400, coil B 402, and coil C 404 in a desired manner to move disc 218 in this illustrative example. A current may be sent to coil A 400, coil B 402, and coil C 404 at different times in different levels to move disc 218 in a desired manner. For example, the desired movement may be at least one of a smooth movement of disc 218, a stepped movement, or some other suitable type of movement.

As depicted, disc plane 408 extends though disc 218. Plate plane 410 extends through plate 210. Disc plane 408 and disc 218 have normal 412. Plate plane 410 and plate 210 have normal 413. Plate plane 410 and normal 413 are a reference plane and normal in this example.

Disc plane 408 and normal 412 may change as disc 218 moves relative to plate 210. Disc plane 408 and normal 412 may be used to identify the position of disc 218 relative to plate 210.

In this example, sensor 414, sensor 416, and sensor 418 are examples of sensors 216 and are physically associated with plate 210. Sensor 414 is configured to generate information about inductance in coil A 400, sensor 416 is configured to generate information about inductance in coil B 402, and sensor 418 is configured to generate information about inductance in coil C 404.

The information about inductance in one or more of coils 212 may be used to identify normal 412. In particular, information about inductance of coils 212 may be used by controller 108 shown in block form in FIG. 1 to identify the position of disc 218 in FIG. 4.

For example, the position of disc 218 may include closest point 422 of disc 218 to plate 210. Closest point 422 is along periphery 424 of disc 218 in this example. At closest point 422, disc 218 may or may not contact plate 210.

During movement of disc 218, closet point 422 of disc 218 relative to plate 210 changes. In this example, disc 218 and closest point 422 move in the direction of arrow 428. As depicted, the movement of disc 218 is a nutating movement rather than a rotational movement. The change in current flowing through coils 212 may be controlled to control movement of disc 218. As the current flowing through coils 212 changes, the inductance in coils 212 may be detected by sensor 414, sensor 416, and sensor 418 to generate information to identify the position of disc 218.

Turning next to FIG. 5, an illustration of a top side of a plate is depicted in accordance with an illustrative embodiment. As depicted, coil A 400 has center 500, coil B 402 has center 502, and coil C 404 has center 504.

The location of coils 212 may be described based on the location of the centers of coils 212. For example, center 500 for coil A 400 has coordinates $(X_a, Y_a)$, center 502 for coil B 402 has coordinates $(X_b, Y_b)$, and center 504 for coil C 404 has coordinates $(X_c, Y_c)$.

Also, inductance may be measured for coils 212. In the illustrative example, inductance for coil A 400 is $L_a$, inductance for coil B 402 is $L_b$, and inductance for coil C 404 is $L_c$.

As depicted, x-axis 506 and y-axis 508 may be located on plate plane 410. Closest point 422 may be described as angle 510 relative to x-axis 506. Closest point 422 may be identified by measuring inductance of coils 212 and identifying an equation for disc plane 408.

Turning now to FIG. 6, an illustration of equations for identifying a position of a disc is depicted in accordance with an illustrative embodiment. The equations illustrated in FIG. 6 are examples of equations that may be used to identify the position of a plane such as disc plane 408 in FIG. 4. The equations also may be used to identify a normal vector for disc plane 408.

Equation 600 is a standard equation for a plane. In this example, equation 600 is used to identify disc plane 408 in FIG. 4. As depicted, x, y, and z are values for coordinates in disc plane 408.

The constants a, b, c, and d in equation 600 may be calculated using equation 602, equation 604, equation 606, and equation 608, respectively. In this example, $L_A$ is the inductance for coil A 400, $L_B$ is the inductance for coil B 402, and $L_C$ is the inductance for coil C 404.

The positions of coil A 400, coil B 402, and coil C 404 also may be used in calculating a, b, c, and d. Particularly, the position of the centers of coil A 400, coil B 402, and coil C 404 may be used.

As illustrated, $x_A$ is the x-value for center 500 of coil A 400 and $y_A$ is the y-value of center 500 of coil A 400. $X_B$ is the x-value for center 502 of coil B 402 and $y_B$ is the y-value of center 502 of coil B 402. $X_C$ is the x-value for center 504 of coil C 404 and $y_C$ is the y-value of center 504 of coil C 404. These positions of coils 212, as well as the inductance for each of coils 212, result in the identification of values a, b, c, and d.

The different values a, b, c, and d, calculated using equation 602, equation 604, equation 606, and equation 608 may be used in equation 600 to identify disc plane 408. Equation 600 represents the equation of disc plane 408 in three-dimensional space.

Normal 412 for disc plane 408 also may be identified using values a, b, and c with equation 610. In this illustrative example, [a,b,c] in equation 610 correspond to [x,y,z] of normal 412. In other words, [a,b,c] provides the normal vector, normal 412, to the disc plane calculated using equation 600.

Controller 108 in FIG. 1 may then use normal 412 as identified by equation 610 to identify closest point 422 on disc 218 relative to plate plane 410. Closest point 422 may be identified by calculating an angle, as described with reference to FIG. 7.

Figure 7:
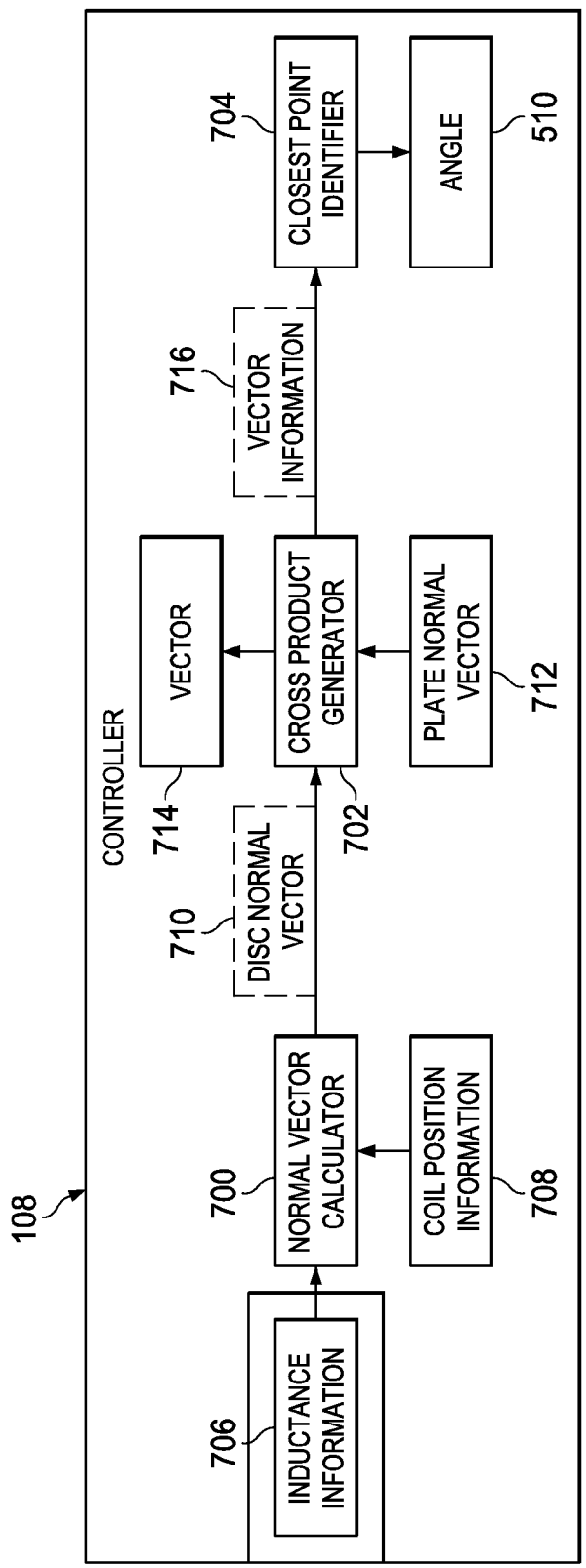
FIG. 7 is an illustration of components in a controller for identifying a position of a disc in accordance with an illustrative embodiment.

With reference next to FIG. 7, an illustration of components in a controller for identifying a position of a disc is depicted in accordance with an illustrative embodiment. An example of components in controller 108 for identifying a position of a disc controlling an electric motor is shown in this figure. As depicted, controller 108 includes normal vector calculator 700, cross product generator 702, and closest point identifier 704. In this example, these components are configured to calculate the position of disc 218 in FIG. 2.

As depicted, normal vector calculator 700 is configured to receive inductance information 706 and coil position information 708. Inductance information 706 includes measured values for inductance of coils 212 as shown in FIGS. 2-5. For example, when coils 212 include coil A 400, coil B 402, and coil C 404 as shown in FIGS. 4-5, inductance information includes $L_A$, $L_B$, and $L_C$.

Coil position information 708 includes positions of coils 212. The positions of coils 212 may be described in a number of ways. For example, the position may be coordinates for the centers of coils 212. These centers may be, for example, center 500, center 502, and center 504 as shown in FIG. 5. These position coordinates correspond to the positions input into equation 602, equation 604, equation 606, and equation 608 as described in FIG. 6 above.

Normal vector calculator 700 uses equation 602, equation 604, and equation 606 to calculate disc normal vector 710. Disc normal vector 710 is a vector for normal 412 in FIG. 4 and may be defined as [a,b,c] or [x,y,z] shown in equation 610 in FIG. 6. In other words, using the position of the centers of coils 212 and the inductance of each of coils 212, normal vector calculator 700 identifies disc normal vector 710.

Cross product generator 702 receives disc normal vector 710 from normal vector calculator 700. Cross product generator 702 also receives plate normal vector 712 for plate 210. Plate normal vector 712 is a vector for normal 413 for plate plane 410 seen in FIG. 4. In this illustrative example, plate normal vector 712 is defined as [0,0,1].

Cross product generator 702 generates vector 714 from a cross product of disc normal vector 710 and plate normal vector 712. Vector 714 is described as [Xn, Yn, Zn]. In the illustrative example, vector 714 is mutually orthogonal to both disc normal vector 710 and plate normal vector 712.

Cross product generator 702 sends vector information 716 to closest point identifier 704 based on vector 714. In this illustrative example, vector information 716 includes $X_N$ and $Y_N$ from vector 714.

With vector information 716, closest point identifier 704 identifies angle 510 for closest point 422. In this illustrative example, angle 510 is identified as $\Phi$=arctan (Yn/Yn). In other illustrative examples, closest point identifier 704 may identify closest point 422 using other information in addition to or in place of $X_N$ and $Y_N$.

The identification of angle 510 is used to determine the position of disc plane 408. With the position of disc plane 408 identified, controller 108 may commutate in a desired manner in real time. For example, because controller 108 has an accurate position of disc plane 408, controller 108 may switch on and off current 114 in FIG. 1 to coils 212 to move disc plane 408 in a desired manner. In some examples, controller 108 may use the position of disc plane 408 identified by angle 510 to operate disc plane 408 more smoothly than with currently used systems.

Figure 8:
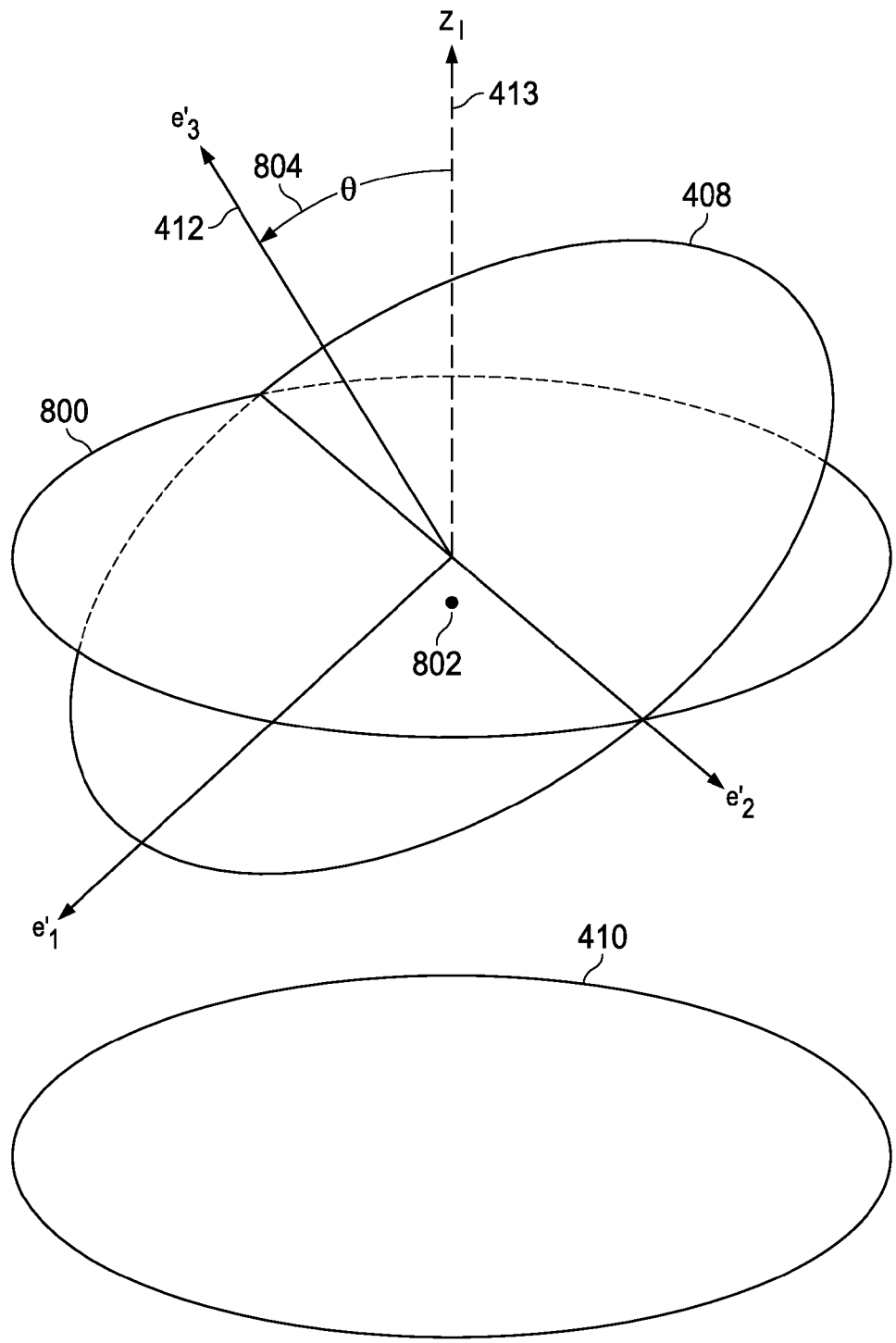
FIG. 8 is an illustration of a position of a disc in accordance with an illustrative embodiment.

Turning next to FIG. 8, an illustration a position of a disc is depicted in accordance with an illustrative embodiment. In this illustrative example, reference plane 800 is parallel to plate plane 410. Disc plane 408 and reference plane 800 both have center 802.

As depicted, angle 804 represents pitch in this illustrative example. Angle 804 is an angle between normal 412 for disc plane 408 and normal 413 for reference plane 800.

In this illustrative example, $Z_I$ is normal 413 of reference plane 800 and $E_3$ is normal 412 of disc plane 408. $E_2$' is the resultant vector of the vector cross product generated by cross product generator 702, which corresponds to vector 714 in FIG. 7. $E_1$' is the resultant vector of a second cross product generator calculated from the cross product of $E_2$' with $E_3$. The resulting vector $E_1$' provides the component information to determine the pitch angle.

Figure 9:
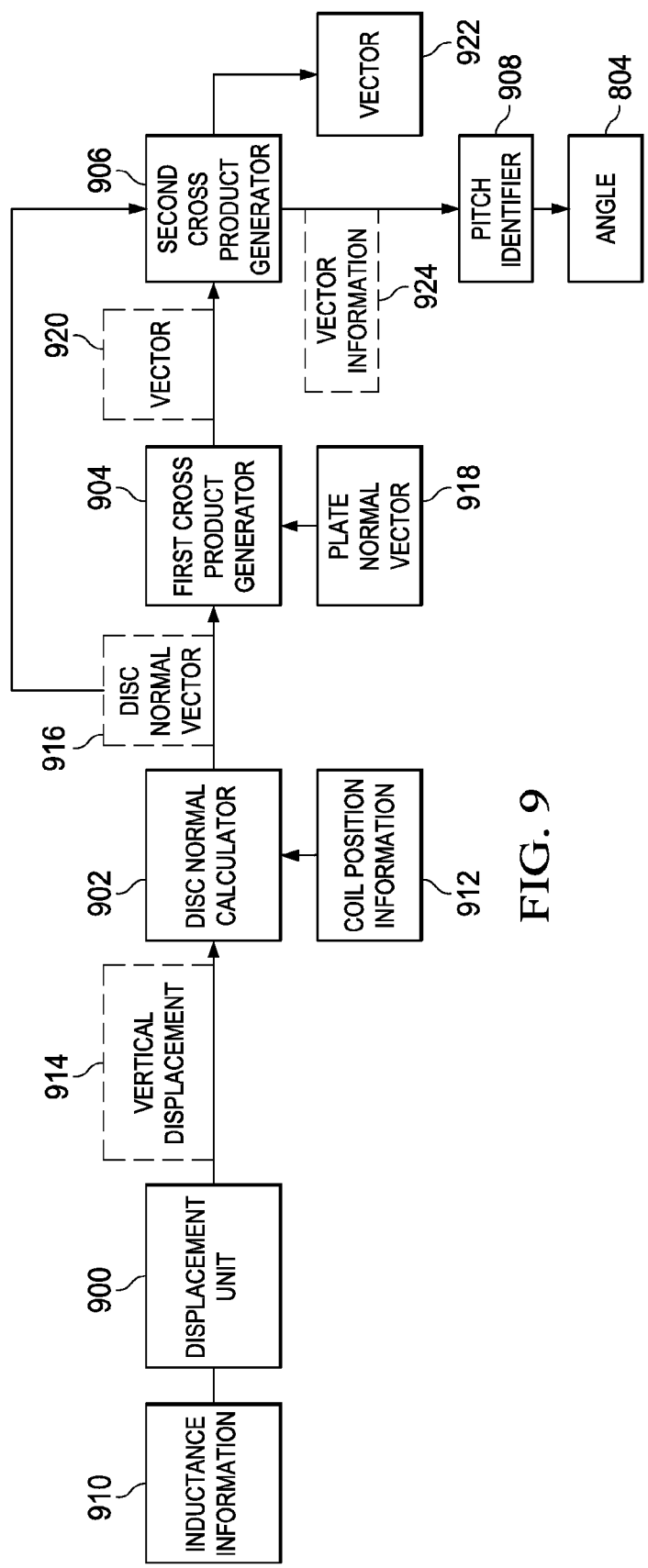
FIG. 9 is an illustration of components in a controller for identifying a position of a disc in accordance with an illustrative embodiment.

The identification of angle 804 may be made in a similar fashion to angle 510 using the equations in FIG. 6 using the process described in FIG. 9. Calculating the pitch angle of disc plane 408 may be used to identify when the gear teeth become disengaged. This situation may occur when the pitch angle decreases by an amount which would cause the gear teeth to slip. The gear teeth are first teeth 224 and second teeth 228 as seen in FIG. 2. For example, the gear teeth may be considered to be disengaged when the pitch angle has a value about 2 degrees less than a desired angle for the pitch angle. Identification of the pitch angle of the disk may be used to determine when disc 218 is not engaging rotor 220 from FIGS. 2-4 in a desired manner.

Additionally, a change in pitch angle can also be an indication of jamming from a foreign object within housing 204 of reluctance motor 200 in FIGS. 2-3. If this situation is detected, reluctance motor 200 may be shut down or maneuvered in such a way as to un-jam or remove the foreign debris.

With reference to FIG. 9, an illustration of components in a controller for identifying a position of a disc is depicted in accordance with an illustrative embodiment. An example of components in controller 108 in FIG. 1 for identifying a position of a disc controlling an electric motor is shown in this figure. As depicted, controller 108 includes displacement unit 900, disc normal calculator 902, first cross product generator 904, second cross product generator 906, and pitch identifier 908. In this example, these components are configured to calculate the pitch of disc 218 in FIG. 2. As depicted, the pitch is angle 804 in FIG. 8.

As depicted, displacement unit 900 receives inductance information 910. Inductance information 910 is comprised of measured values for the inductance of coils 212.

Displacement unit 900 identifies vertical displacement 914 based on inductance information 910. Displacement unit 900 is used to convert inductance information 910 to spatial information because three spatial dimensions are needed to calculate a pitch angle.

As disc plane 408 gets closer to coils 212 seen in FIGS. 2-5, the inductance is at a maximum. The inductance is at a minimum at the highest point. Accordingly, vertical displacement 914 can be identified using a linear extrapolation equation $z=-k*(L-L_{max})$, where L is the inductance of the coil at a period of time, $L_{max}$ is the contact inductance, and k is constant. In this manner, inductance information 910 is converted to a vertical displacement, represented by z. While a linear extrapolation method is the manner in which displacement may be identified, other techniques may also be used. For example, another technique may be a higher order polynomial approximation to provide a higher degree of accuracy given geometrical dependency of inductance.

Disc normal calculator 902 receives vertical displacement 914 from displacement unit 900. Additionally, disc normal calculator 902 also receives coil position information 912. Coil position information 912 is the position of coils 212, as described with reference to FIG. 7 above.

Disc normal calculator 902 identifies disc normal vector 916. This identification is made using equation 602, equation 604, and equation 606 illustrated in FIG. 6 in this particular example. Disc normal vector 916 is defined as [a,b,c].

First cross product generator 904 receives disc normal vector 916 as an input. Additionally, first cross product generator 904 also receives plate normal vector 918 as an input. In this illustrative example, plate normal vector 918 is defined as [0,0,1]. First cross product generator 904 generates vector 920 from a cross product of disc normal vector 916 and plate normal vector 918. Vector 920 is defined as [Xn,Yn,Zn].

Second cross product generator 906 receives vector 920 and disc normal vector 916 as inputs. Second cross product generator 906 generates a cross product of these two vectors resulting in vector 922. In this illustrative example, vector 922 is defined as [Xm,Ym,Zm].

Second cross product generator 906 sends vector information 924 to pitch identifier 908. In this illustrative example, vector information 924 includes [Xm,Ym,0] and [Xm,Ym, Zm]. In the illustrative example, A=[xm,ym,0] and B=[xm, ym,zm]. As depicted, the z component of the A vector is set equal to zero because the angle of interest is the angle between the B vector and the projection of the B vector onto the coil plane. As depicted, B represents the vector of prior cross product in first cross product generator 904. As depicted, A is a vector that is based off B with the z component set equal to zero placing A on the x and y plane.

Pitch identifier 908 identifies angle 804. Angle 804 is the pitch angle in this illustrative example. Angle 804 is identified as $\theta=\arccos(A*B/(|A|*|B|))$.

The identification of angle 804 is used to determine whether disc 218 is deviating from a desired angle of engagement. The angle of engagement is the angle where first teeth 224 on rotor 220 and second teeth 228 on disc 218 engage each other in FIG. 2. Changes from the angle of engagement may result in disc 218 slipping relative to rotor 220 is the change is greater than a selected threshold. In other words, if the pitch of disc 218 identified using angle 804 becomes less than a tolerance surrounding the angle of engagement, disc 218 may slip relative to rotor 220. The tolerance may be, for example, about −2 degrees. This situation may reduce the performance of reluctance motor 200.

The identification of the pitch angle, angle 804, may be used to indicate when actions may be taken to reduce or prevent slipping of disc 218. A controller may be implemented to control law to implement preventative measures if angle 804 indicates that disc 218 may slip relative to rotor 220. For example, one action that may be taken may be to increase the current such that disc 218 may be held with a desired value for angle 804 with respect to the desired angle of engagement.

The identification of angle 804 may also be used to determine if foreign debris is present affecting engagement of first teeth 224 on rotor 220 with second teeth 228 on disc 218. Additionally, if a presence of foreign debris is detected, actions may also be initiated by controller 108 to remove or reduce the effect of the foreign debris.

With the pitch of disc plane 408 identified, controller 108 may commutate in a desired manner in real time. For example, because controller 108 has an accurate pitch of disc plane 408, controller 108 may switch on and off current to coils 212 to move disc plane 408 in a desired manner.

Figure 10:
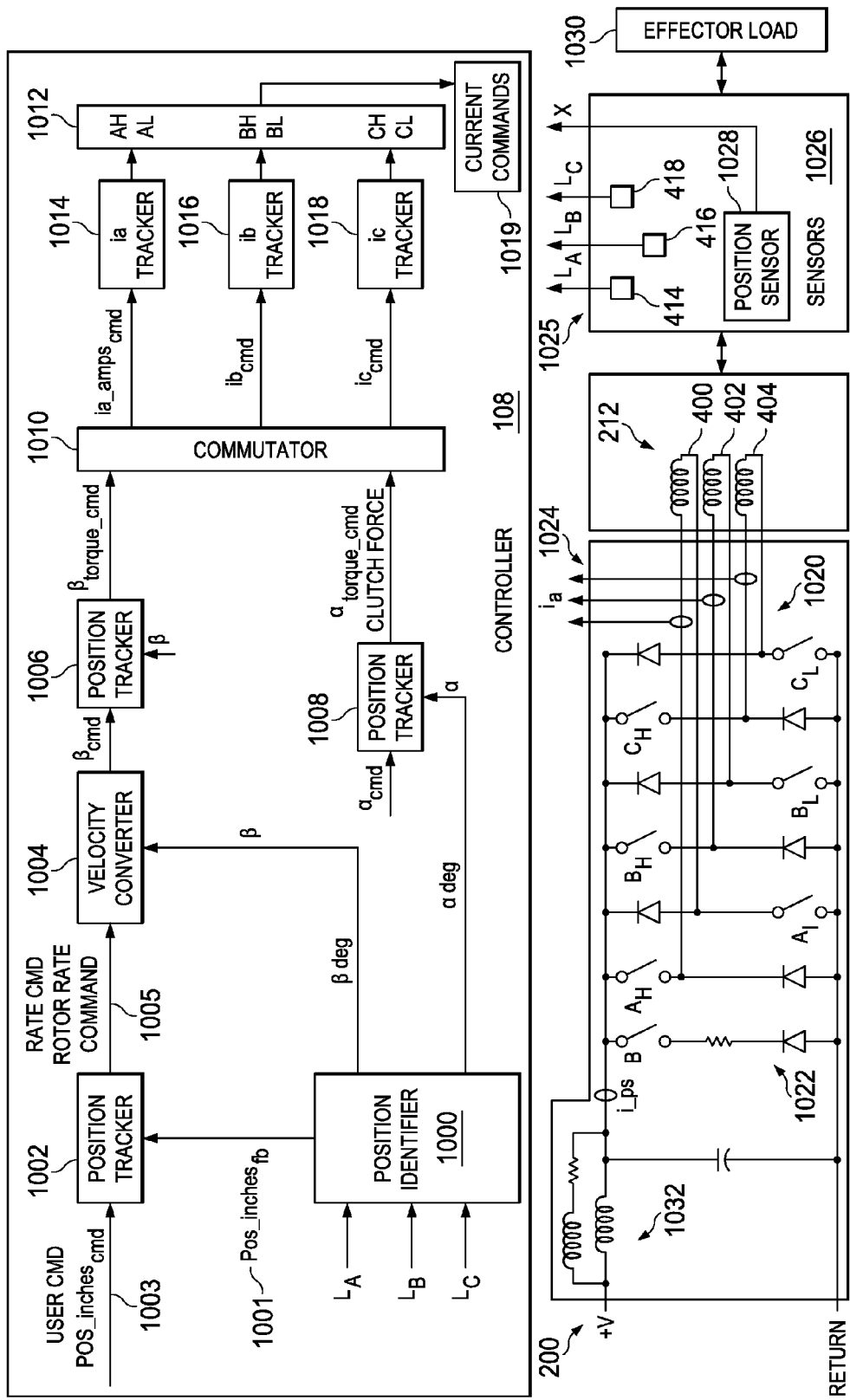
FIG. 10 is an illustration of an electric motor control system in accordance with an illustrative embodiment.

In FIG. 10, an illustration of an electric motor control system is depicted in accordance with an illustrative embodiment. In this example, the operation of reluctance motor 200 in FIG. 2 using controller 108 in FIG. 1 is shown in greater detail.

As illustrated, controller 108 includes position identifier 1000, position tracker 1002, velocity converter 1004, position tracker 1006, position tracker 1008, commutator 1010, and current trackers 1012. Position identifier 1000 is one example of an implementation for components shown in FIG. 7 and FIG. 9. In other words, position identifier 1000 includes components to calculate angle 510, angle 804, or both angle 510 and angle 804, to identify the position of disc plane 408.

In this illustrative example, position identifier 1000 accepts inductance measurements, $L_A$, $L_B$, and $L_C$, corresponding to coil A 400, coil B 402, and coil C 404 in FIG. 4. Position identifier 1000 then outputs an angular position of disc plane 408, as described with reference to FIG. 7 and FIG. 9. The angular position may include angle 510, angle 804, both, or other suitable angular position information.

As depicted, position tracker 1002 accepts commands for operation of reluctance motor 200 from a user. These commands may include commanded rotor arm position 1001 of reluctance motor 200. In particular, commanded rotor arm position 1001 may be a deflection of a rotor arm in reluctance motor 200. Position tracker 1002 compares commanded rotor arm position 1001 to rotor arm position 1003. Rotor arm position 1003 may be the current position of the rotor arm. If commanded rotor arm position 1001 does not match rotor arm position 1003, position tracker 1002 provides an error value representative of the difference between commanded rotor arm position 1001 and rotor arm position 1003.

Position tracker 1002 then generates rate command 1005 for disc plane 408. Rate command 1005 is used to advance disc plane 408 to a desired position such that the rotor arm may be in commanded rotor arm position 1001. In this example, rate command 1005 may be a spin command for disc plane 408.

As depicted, velocity converter 1004 converts velocity to incremental velocity. Velocity converter 1004 calculates an output velocity using the equation $\beta_{cmd} = \beta + \Delta\beta_{cmd}$, where $\beta$ is an output of position identifier 1000 and $\Delta\beta_{cmd}$ is rate command 1005.

In this depicted example, position tracker 1006 calculates the difference between the measured shaft position, $\beta$, and rate command 1005. Position tracker 1008 calculates the difference between the commanded position of disc plane 408 and measured position, $\alpha$, of disc plane 408.

In this illustrative example, commutator 1010 controls the current in coils 212 in reluctance motor 200. Timing for the current in coils 212 is calculated based upon the position of disc plane 408 and the velocity and distance of disc plane 408 needed to turn to advance the rotor arm. In other words, the order of switching and magnitude of current for coils 212 is determined. This order of switching may then be employed by controller 108 to send current to coils 212 in the desired order.

As depicted, current trackers 1012 are the current control blocks. In this example, current trackers 1012 include current tracker 1014, current tracker 1016, and current tracker 1018. Current tracker 1014 monitors and commands current in coil A 400, current tracker 1016 monitors and commands current in coil B 402, and current tracker 1018 monitors and commands current in coil C 404. Based on the current monitored by each of current trackers 1012, current commands 1019 may be sent to switching system 1020 to increase or decrease the magnitude of current in each of coil A 400, coil B 402, and coil C 404.

In this illustrative example, reluctance motor 200 includes switching system 1020, coils 212, and sensors 1026. Switching system 1020 comprises switches 1022 that control current to coils 212. Current commands 1019 command switches 1022 to switch on and off.

Switching system 1020 is hardware which is connected to a power supply and coils 212 in this illustrative example. Current commands 1019 may command switches 1022 to toggle on and off or operate in some other suitable manner.

As illustrated, current measurements 1024 are taken for coil A 400, coil B 402, and coil C 404. Current measurements 1024 may be denoted by $i_a$, $i_b$, and $i_c$, and associated with coil A 400, coil B 402, and coil C 404, respectively. In this example, current measurements 1024 for each of coils 212 are input into current trackers 1012. Current measurements 1024 may be taken using current sensors (not shown).

In this depicted example, sensors 1026 include sensor 414, sensor 416, sensor 418, and position sensor 1028. Sensor 414, sensor 416, and sensor 418 generate inductance measurements 1025 for coil A 400, coil B 402, and coil C 404, respectively. Inductance measurements 1025 include $L_A$, $L_B$, and $L_C$, and provide input into position identifier 1000 to calculate position information, as described above. Position sensor 1028 measures rotor arm position 1003. Position sensor 1028 may be a radial position sensor in this illustrative example. Rotor arm position 1003 is sent to position tracker 1002 to compare with commanded rotor arm position 1001.

As depicted, effector load 1030 may be a physical load on reluctance motor 200. In this example, power filter 1032 may be a filter for the input power.

In this manner, a feedback loop is created such that the current in coils 212 may be more accurately controlled. Moreover, disc plane 408 is controlled by controller 108 such that the rotor arm moves to a commanded position. In turn, current commands 1019 sent to switches 1022 may be changed dynamically to operate coils 212 in a desired manner. As a result, reluctance motor 200 may operate efficiency and smoothly.

Figure 11:
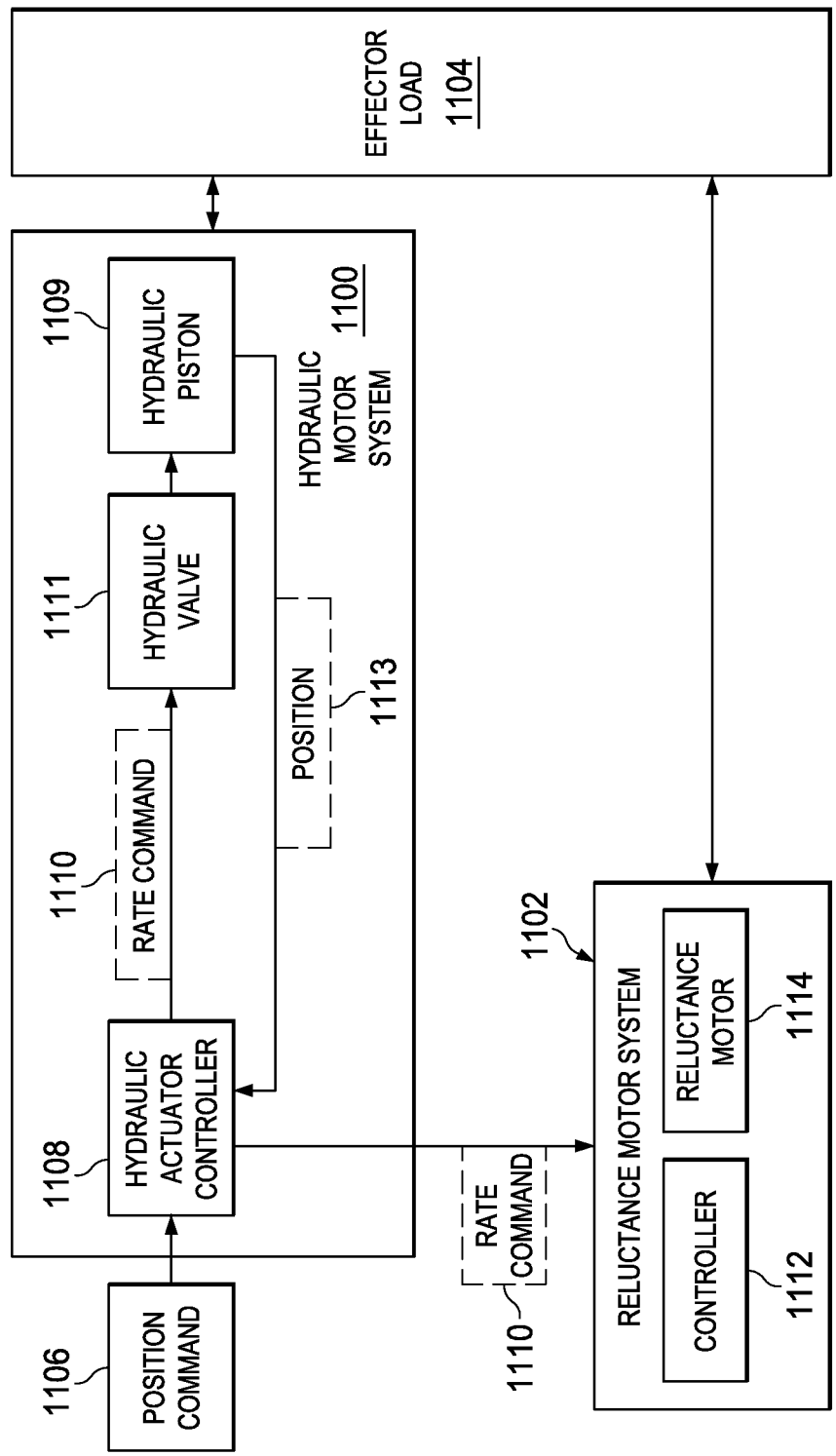
FIG. 11 is an illustration of a hydraulic motor system with a booster in accordance with an illustrative embodiment.

Turning to FIG. 11, an illustration of a hydraulic motor system with a booster is depicted in accordance with an illustrative embodiment. In this illustrative example, hydraulic motor system 1100 and reluctance motor system 1102 are shown. Reluctance motor system 1102 may be an example of one implementation for reluctance motor 118 with controller 108 shown in block form in FIG. 1.

As depicted, hydraulic motor system 1100 and reluctance motor system 1102 are operating in parallel. In some examples, reluctance motor system 1102 may be a booster for hydraulic motor system 1100. When reluctance motor system 1102 is a booster, reluctance motor system 1102 may provide additional force for effector load 1104.

In this illustrative example, position command 1106 is sent to hydraulic actuator controller 1108. Position command 1106 may be a desired position for hydraulic piston 1109. Hydraulic actuator controller 1108 then generates rate command 1110 for operation of hydraulic motor system 1100. In particular, rate command 1110 may be a command to operate hydraulic valve 1111 and hydraulic piston 1109 in hydraulic motor system 1100. The position of hydraulic piston 1109 may be measured and position 1113 may be input into hydraulic actuator controller 1108 to generate a new rate command in this illustrative example.

Hydraulic actuator controller 1108 also may send rate command 1110 to controller 1112 in reluctance motor system 1102. In this manner, synchronization between operation of hydraulic actuator controller 1108 and controller 1112 may occur. Controller 1112 in reluctance motor system 1102 may be one example of an implementation for controller 108 in FIG. 1. Controller 1112 may use rate command 1110 to operate reluctance motor 1114 in a desired manner. For example, controller 1112 may use rate command 1110 to change the position of a disc plane in reluctance motor 1114, as described above. As an example, controller 1112 may use position identifiers, position trackers, inductance sensors, position sensors, and other components or combinations of components discussed with reference to FIGS. 2-10 to control operation of reluctance motor system 1102 to provide additional force for effector load 1104.

Thus, with controller 1112 in hydraulic motor system 1100, increased accuracy in at least one of moving or positioning hydraulic valve 1111, hydraulic piston 1109, or both may be performed. As a result, a higher amount of controllability may be present for performing operations on effector load 1104.

Figure 12:
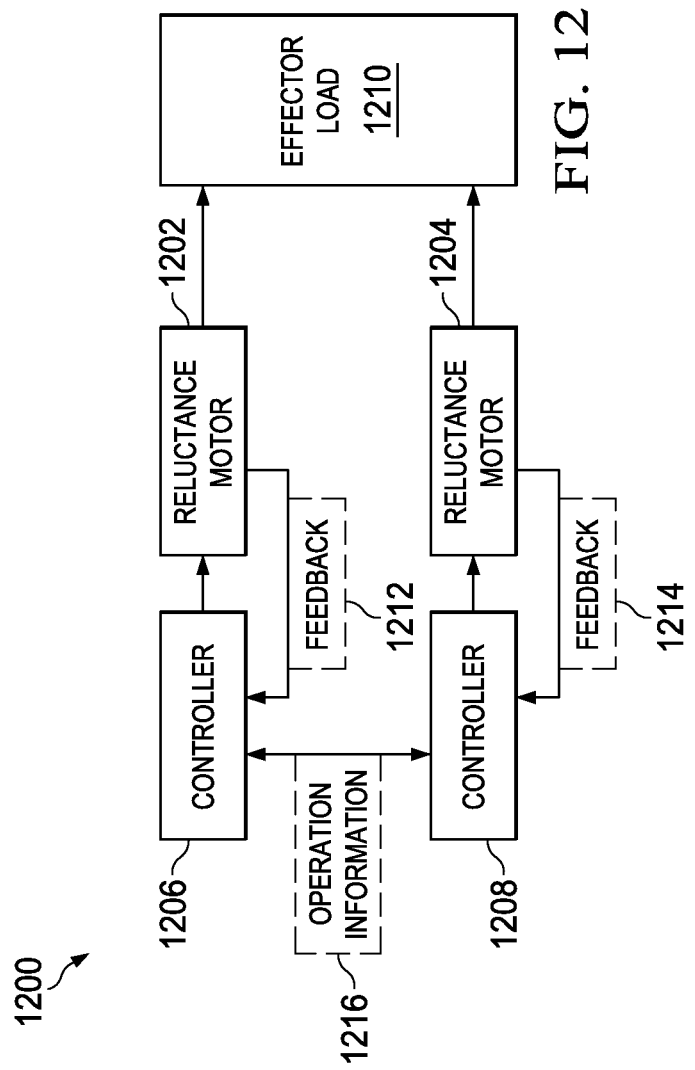
FIG. 12 is an illustration of a group of electric motors in accordance with an illustrative embodiment.

With reference now to FIG. 12, an illustration of a group of electric motors is depicted in accordance with an illustrative embodiment. Group of electric motors 1200 may be one example of an implementation for group of electric motors 104 in FIG. 1.

Group of electric motors 1200 includes reluctance motor 1202 with controller 1206 and reluctance motor 1204 with controller 1208. Reluctance motor 1202 and reluctance motor 1204 may be virtual ellipse devices operating in parallel in these illustrative examples. Reluctance motor 1202 and reluctance motor 1204 may operate in parallel to provide a desired level of force on effector load 1210.

As depicted, reluctance motor 1202 and reluctance motor 1204 each comprise components shown in reluctance motor 200 shown in FIG. 2. Controller 1206 and controller 1208 comprise components described with reference to controller 108 in FIG. 10. For example, controller 1206 and controller 1208 may include a position identifier, position trackers, a velocity converter, a commutator, current trackers, and other components for monitoring and calculating position and rate information for reluctance motor 1202 and reluctance motor 1204, respectively.

In this illustrative example, feedback 1212 is sent from reluctance motor 1202 to controller 1206, while feedback 1214 is sent from reluctance motor 1204 to controller 1208. Feedback 1212 may include position information of a rotor arm in reluctance motor 1202, inductance measurements of coils in reluctance motor 1202, current measurements, the angular position of a disc within reluctance motor 1202, and other suitable types of feedback that controller 1206 may use to alter the position of components within reluctance motor 1202. Feedback 1214 may include position information of a rotor arm in reluctance motor 1204, inductance measurements of coils in reluctance motor 1204, current measurements, the angular position of a disc within reluctance motor 1204, and other suitable types of feedback that controller 1208 may use to alter the position of components within reluctance motor 1204. Feedback 1212 and feedback 1214 may be used by various components within controller 1206 and controller 1208, respectively, as described above.

Additionally, in this illustrative example, controller 1206 and controller 1208 may be in communication with each other. For example, controller 1206 may send operation information 1216 to controller 1208. Operation information 1216 may include, for example, rate commands, rotor position information, inductance measurements, and other suitable types of information. Operation information 1216 may be used by controller 1206 and controller 1208 to operate reluctance motor 1202 and reluctance motor 1204 in parallel as desired.

The different components shown in FIGS. 2-12 may be combined with components in FIG. 1, used with components in FIG. 1, or a combination of the two. Additionally, some of the components in FIGS. 2-12 may be illustrative examples of how components shown in block form in FIG. 1 can be implemented as physical structures.

Further, the illustration of reluctance motor 200 in FIGS. 2-10 are not meant to limit the manner in which other illustrative embodiments may be implemented. For example, although three coils are shown for reluctance motor 200, other number of coils may be used in other illustrative examples. For example, two coils, five coils, eight coils or some other number of coils may be used. Further, the different electric motors in the illustrative examples may be operated in one or more different quadrants.

Figure 13:
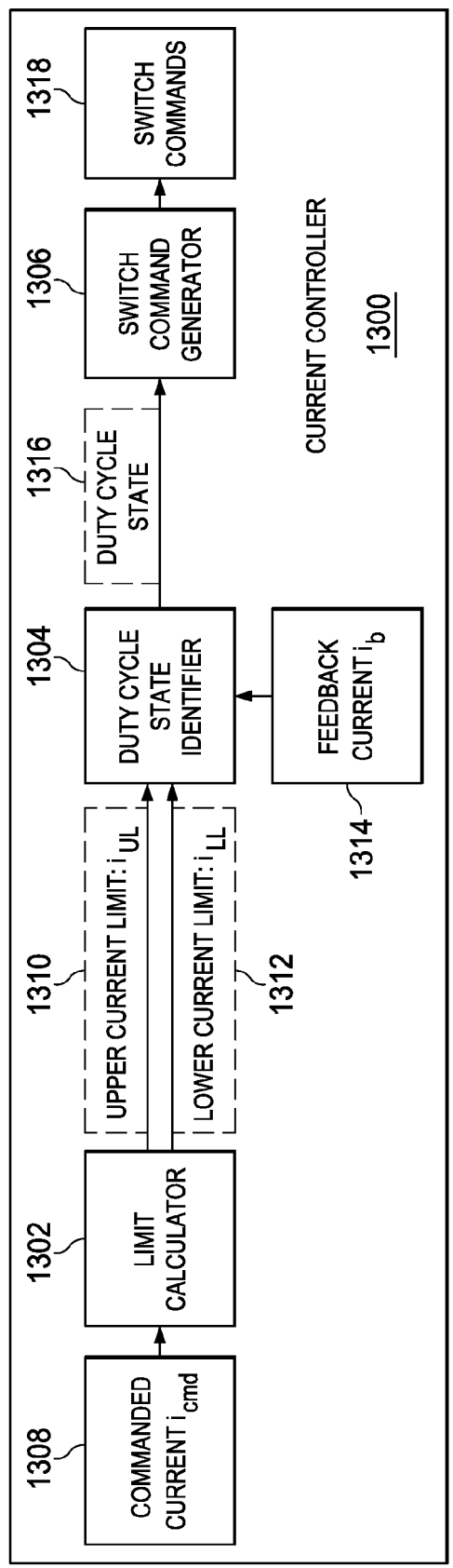
FIG. 13 is an illustration of a block diagram of a current controller in accordance with an illustrative embodiment.

Turning next to FIG. 13, an illustration of a block diagram of a current controller is depicted in accordance with an illustrative embodiment. In this illustrative example, current controller 1300 may be implemented in controller 108 in FIG. 1. In particular, current controller 1300 may be used to select a range of values for current 114 sent to group of electric motors 104 in FIG. 1. This control of current 114 may be performed while current flows through coils 124 in reluctance motor 118 in FIG. 1.

Current controller 1300 is configured to control the magnitude of current 114 sent to group of electric motors 104 as current 114 changes during operation of reluctance motor 118. In other words, when a commanded current is identified for sending current 114 to group of electric motors 104, a range for the magnitude may be used to send current 114 based on the commanded current to reluctance motor 118. In these illustrative examples, the commanded current is a value for a magnitude of current 114 that is sent to group of electric motors 104.

In this illustrative example, current controller 1300 includes a number of components. As depicted, current controller 1300 includes limit calculator 1302, duty cycle state identifier 1304, and switch command generator 1306.

Limit calculator 1302 receives commanded current ($i_{cmd}$) 1308 as an input. Limit calculator 1302 identifies upper current limit ($i_{UL}$) 1310 and lower current limit ($i_{LL}$) 1312 from commanded current 1308. These two values identify a range for commanded current 1308. In this illustrative example, the identification may be made in a number of different ways. For example, upper current limit 1310 may be $i_{cmd}$+k and lower current limit 1312 may be $i_{cmd}$−k. As depicted, k is constant and may be selected as any desired value in the illustrative example. In other illustrative examples, the constant may be different when identifying upper current limit 1310 as compared to identify lower current limit 1312.

In this manner, current 114 may be controlled to flow in coils 124 within a range of commanded current 1308 with the limit being defined by upper current limit 1310 and lower current limit 1312.

Duty cycle state identifier 1304 receives upper current limit 1310 and lower current limit 1312 from limit calculator 1302 as inputs. Additionally, duty cycle state identifier 1304 also receives feedback current $i_b$ 1314 as an input. These inputs are used to identify duty cycle state 1316. Feedback current $i_b$ 1314 is the current flowing through coils 212.

Duty cycle state 1316 is sent to switch command generator 1306. Switch command generator 1306 generates switch commands 1318 from duty cycle state 1316. These switch commands are for switches in controller 108 that control sending of current from a power supply to an electric motor such as reluctance motor 118.

Switch commands 1318 control switches that control the transient application of voltage across the coils of an electric motor, such as coils 124 in reluctance motor 118, to change the magnitude of the current. These switches may be, for example, switches 1022 in FIG. 10. The application of the voltage changes over time for a given duty cycle for changes in the magnitude current in the coils.

The duty cycle provides the fraction of time that the voltage is applied across the coils. During this fraction of time, the voltage applied across the windings affects the magnitude of the current in the windings.

In this manner, feedback current $i_b$ 1314 provides information to identify a duty cycle. The comparison of feedback current $i_b$ 1314 with commanded current 1308 is used in this illustrative example to identify duty cycle state 1316. As depicted, a duty cycle identified from duty cycle state 1316 is applied to the switches to change the current in the coils in a desired manner.

Figures 14, 15:
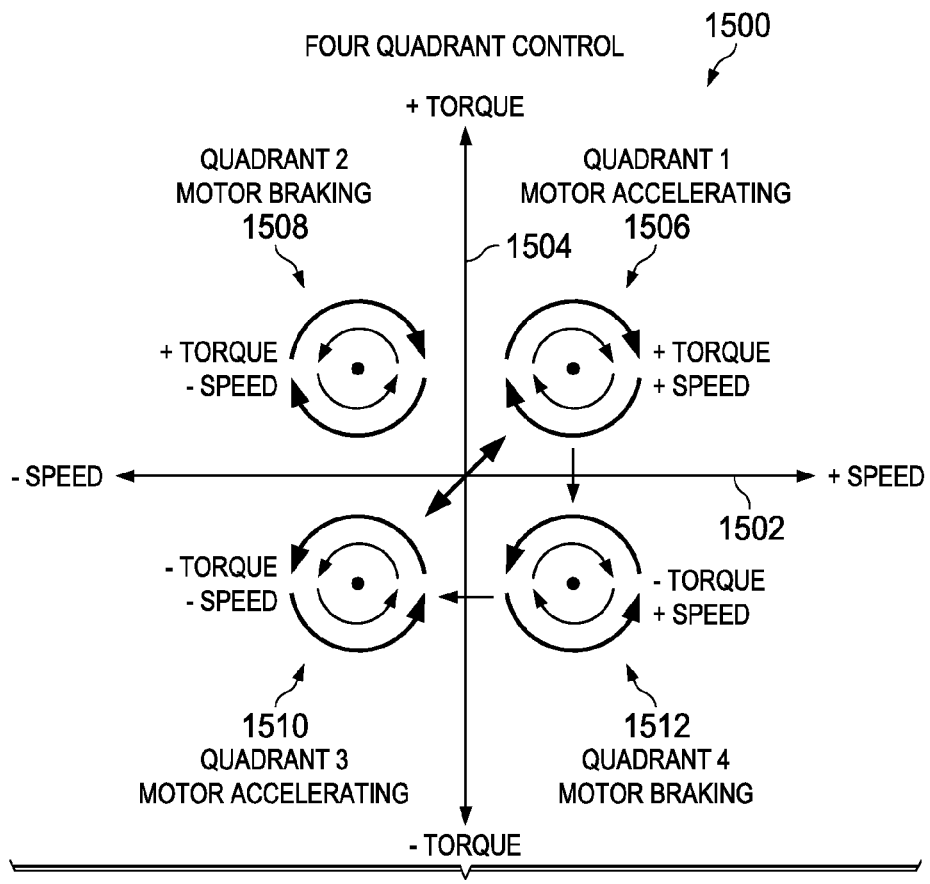
FIG. 14 is an illustration of a table of a duty cycle state in accordance with an illustrative embodiment.
FIG. 15 is an illustration of four-quadrant control in accordance with an illustrative embodiment.

Turning next to FIG. 14, an illustration of a table of duty cycle state 1316 from FIG. 13 is depicted in accordance with an illustrative embodiment. In this illustrative example, table 1400 illustrates duty cycle states that may be identified by duty cycle state identifier 1304 for duty cycle state 1316.

In this illustrative example, table 1400 includes condition column 1402 and duty cycle state column 1404. As illustrated, table 1400 includes entry 1406, entry 1408, entry 1410, and entry 1412. Depending on the inputs, such as upper current limit 1310, lower current limit 1312, and feedback current $i_b$ 1314, a particular condition may be met in condition column 1402 to identify a duty cycle state in duty cycle state column 1404 for the particular entry.

As a result, constant gain values may be unnecessary to actively change the duty cycle. In other words, an active control of the duty cycle in which the duty cycle is changed constantly during operation of reluctance motor 118 is unnecessary. Thus, the use of a proportional-integral-derivative (PID) technique in which the duty cycle changes to minimize the error between feedback current and the commanded current is not needed.

Instead, the illustrative example identifies duty cycle state 1316 based upon logical comparisons between the measured current and the upper and lower commanded current limits. In this example, the measured current is feedback current $i_b$ 1314. In the illustrative example, duty cycle state 1316 may be, for example, increasing current state (100% duty cycle), current decay state (0% duty cycle) and regen current (−100% duty cycle). Other numbers of states may be used in a particular implementation. The state is identified and used with the range to control current that is commanded for reluctance motor 118 in a manner that is simpler than currently used control systems.

The "tightness of control" around the commanded current can change during operation of reluctance motor 118. In other words, range may change. Change in the range may be selected to reduce current swings. In other words, a first current range may be selected and gradually decrease during operation of reluctance motor 118.

In this manner, current controller 1300 in FIG. 13 may provide an ability to allow current 114 to vary within range for commanded current 1308 and using current controller 1300. That is, controller 108 may identify position 132 of disc 120 identified when current 114 should be sent to coils 124 in FIG. 1. Additionally, controller 108 also may be configured to identify controlling the current within coils 124. This control may be performed using current controller 1300 in FIG. 13 once current 114 is flowing through coils 124.

The illustrations of current controller 1300 in FIG. 13 and table 1400 in FIG. 14 are not meant to limit the manner in which other current controllers may be implemented. For example, other numbers of entries, conditions, or duty cycles may be present for identifying duty cycle state 1316 in FIG. 13.

This type of controller for current controller 1300 that uses at least one of states or ranges is associated with the changing inductance of reluctance motor 118. Because the inductance changes with respect to time, constant gain values used in a traditional proportional-integral-derivative (PID) controller may not be used. Gain constants are good for a constant value of inductance. With the inductance changing over time, the gain constants would have to change over time as well. As a result, current controller 1300 uses a range around the commanded current to tell current controller 1300 when to switch from increase current to coast to regeneration. The position calculator coupled with this type of control is configured to provide a desired level of smooth commutation and operation of reluctance motor 118.

With reference now to FIG. 15, an illustration of four-quadrant control is depicted in accordance with an illustrative embodiment. In this illustrative example, electric motor system 102 in FIG. 1 may be used in multiple instances. In particular, controller 108 may be used to control group of electric motors 104 in FIG. 1 to operate in the four quadrants as illustrated by graph 1500. Controller 108 is configured to control operation of group of electric motors 104 in one or more of the four quadrants illustrated in graph 1500.

As depicted, graph 1500 illustrates torque versus speed. X-axis 1502 represents speed. Y-axis 1504 represents torque. In this illustrative example, first quadrant 1506, second quadrant 1508, third quadrant 1510, and fourth quadrant 1512 are illustrated. First quadrant 1506 represents acceleration of the motor in which speed is in a first direction with torque in a first direction. Second quadrant 1508 represents motor braking in which torque is in the reverse direction while speed is in the forward direction. Third quadrant 1510 represents acceleration of the motor with torque in a second direction and speed in a second direction. Fourth quadrant 1512 represents braking of the motor running in reverse. In this quadrant, the speed is in the reverse direction while the torque is in the forward direction.

The different electric motors in the illustrative examples may be controlled to operate in one or more of the four different quadrants described in FIG. 15. For example, controller 108 in FIG. 1 may control reluctance motor 118 to operate in one or more of first quadrant 1506, second quadrant 1508, third quadrant 1510, and fourth quadrant 1512.

Figure 16:
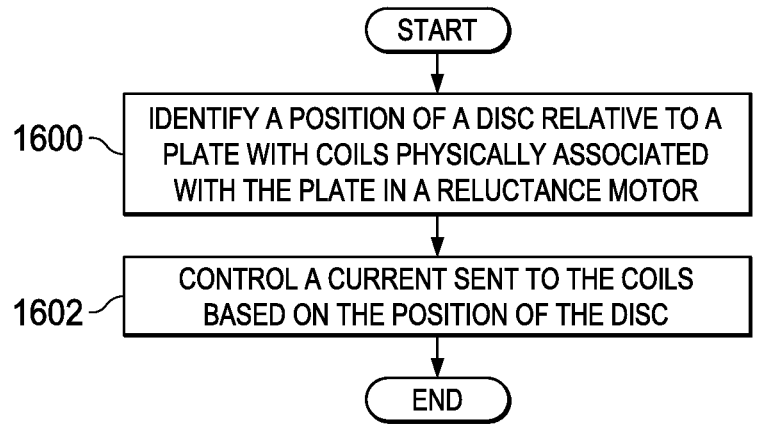
FIG. 16 is an illustration of a flowchart of a process for controlling the operation of an electric motor in accordance with an illustrative embodiment.

With reference now to FIG. 16, an illustration of a flowchart of a process for controlling the operation of an electric motor is depicted in accordance with an illustrative embodiment. The process illustrated in FIG. 16 may be implemented in electric motor system 102 to control group of electric motors 104 in FIG. 1. For example, the different operations illustrated may be implemented to control reluctance motor 118.

The process begins by identifying a position of a disc relative to a plate with coils physically associated with the plate in a reluctance motor (operation 1600). Thereafter, the process controls a current sent to the coils based on the position of the disc (operation 1602), with the process terminating thereafter. Disc 120 is configured to move such that closest point 126 between disc 120 and plate 122 changes along periphery 128 of disc 120 with plate 122 in FIG. 1. In these illustrative examples, these operations are performed dynamically during the operation of electric motor.

Figure 17:
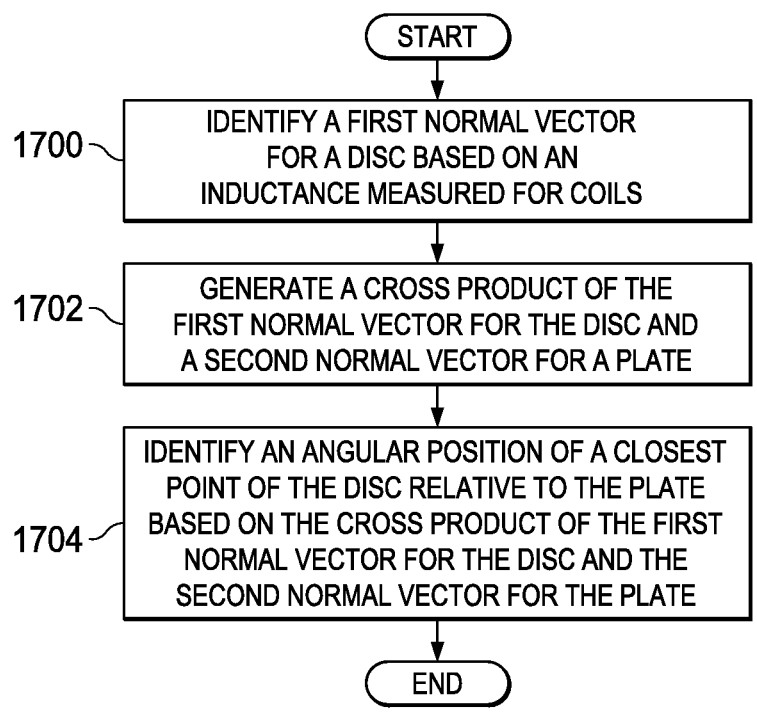
FIG. 17 is an illustration of a flowchart of a process for identifying a position of a disc in an electric motor in accordance with an illustrative embodiment.

With reference next to FIG. 17, an illustration of a flowchart of a process for identifying a position of a disc in an electric motor is depicted in accordance with an illustrative embodiment. The process illustrated in FIG. 17 is an example of one implementation for operation 1600 in FIG. 16.

The process begins by identifying a first normal vector for a disc based on an inductance measured for coils (operation 1700). The process then generates a cross product of a first normal vector for the disc and a second normal vector for a plate (operation 1702). An angular position of a closest point of the disc relative to the plate is identified based on the cross product of the first normal vector for the disc and the second normal vector for the plate (operation 1704), with the process terminating thereafter.

Figure 18:
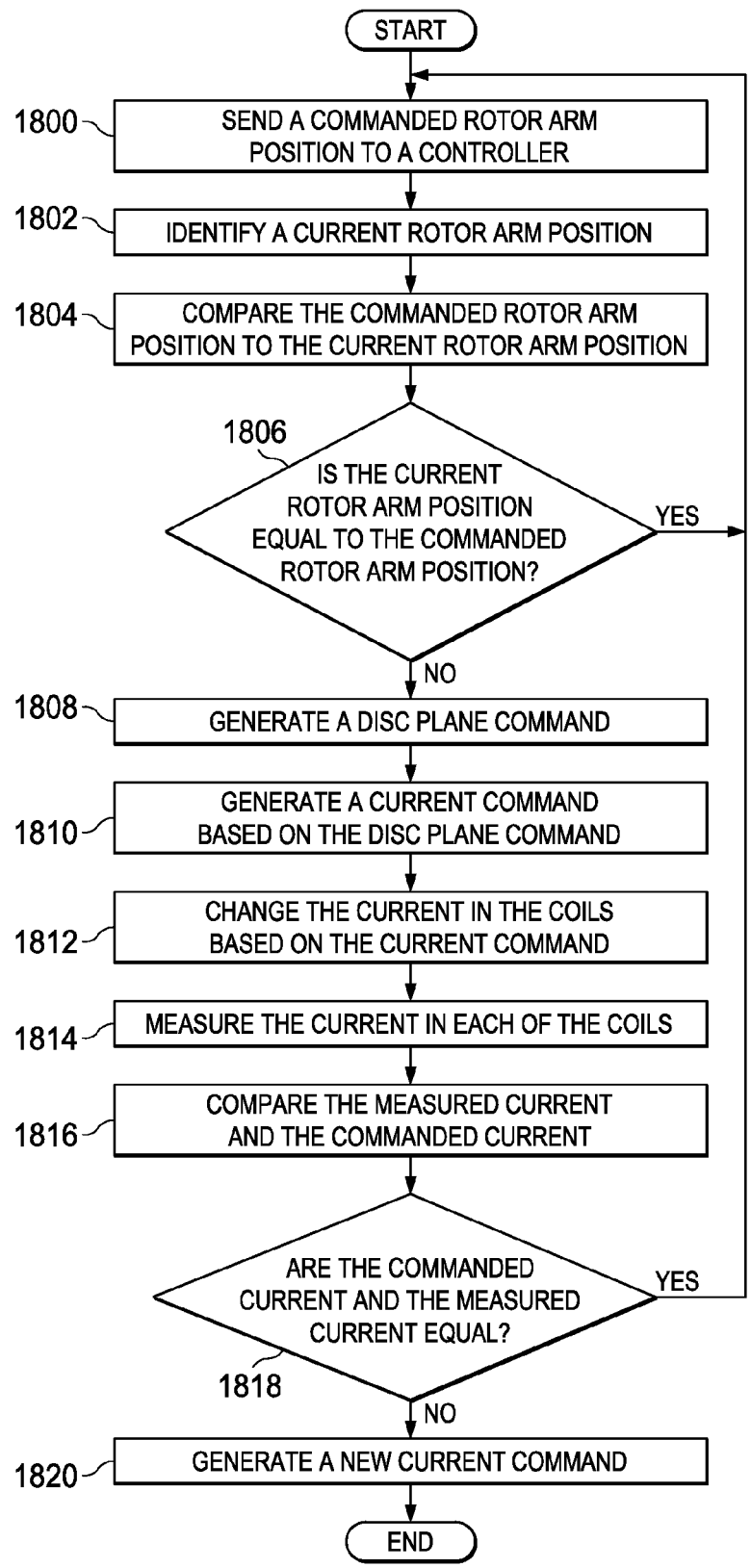
FIG. 18 is an illustration of a flowchart of a process for operating an electric motor system in accordance with an illustrative embodiment.

With reference next to FIG. 18, an illustration of a flowchart of a process for operating an electric motor system is depicted in accordance with an illustrative embodiment. The process illustrated in FIG. 18 may be implemented by controller 108 for reluctance motor 118 in FIG. 1.

The process begins by sending a commanded rotor arm position to a controller (operation 1800). This commanded rotor arm position may be a deflection position, x, entered by a user of reluctance motor 118.

Next, the process identifies a current rotor arm position (operation 1802). The process then compares the commanded rotor arm position to the current rotor arm position (operation 1804). A determination is made as to whether the current rotor arm position is equal to the commanded rotor arm position (operation 1806). If the current rotor arm position and the commanded rotor arm position are equal, the process returns to operation 1800.

If the current rotor arm position and the commanded rotor arm position are not equal, the process generates a disc plane command (operation 1808). This disc plane command may be an angular position or velocity command used to change the position of disc plane 408 relative to coils 212. In other words, this disc plane command may result in disc plane 408 nutating relative to plate plane 410.

Thereafter, a current command is generated based on the disc plane command (operation 1810). This current command may be a command to increase or decrease the magnitude of current in one or more of coils 212. The process then changes the current in the coils based on the current command (operation 1812). A change in the current in coils 212 may cause disc plane 408 to nutate.

Next, the current in each of the coils is measured (operation 1814). The process then compares the measured current and the commanded current (operation 1816). A determination is made as to whether the commanded current and the measured current are equal (operation 1818).

If the commanded current and the measured current are not equal, a new current command is generated (operation 1820), with the process terminating thereafter. This current command may further increase or decrease the magnitude of the current in coils 212. For example, when the measured current is less than the commanded current, switches 1022 may be closed to apply full power supply voltage across coils 212.

In other examples, when the measured current is within a desired threshold from the commanded current, switches 1022 may toggle on and off to provide continuous asynchronous recirculation. In still other examples, if the measured current is higher than desired, all of switches 1022 may be opened to provide full negative power supply voltage across coils 212.

Returning to operation 1818, if the commanded current and the measured current are equal, the process returns to operation 1800, as described above. In this manner, a feedback loop is created to provide dynamic control of coils 212 to operate disc plane 408 in a desired manner.

Figure 19:
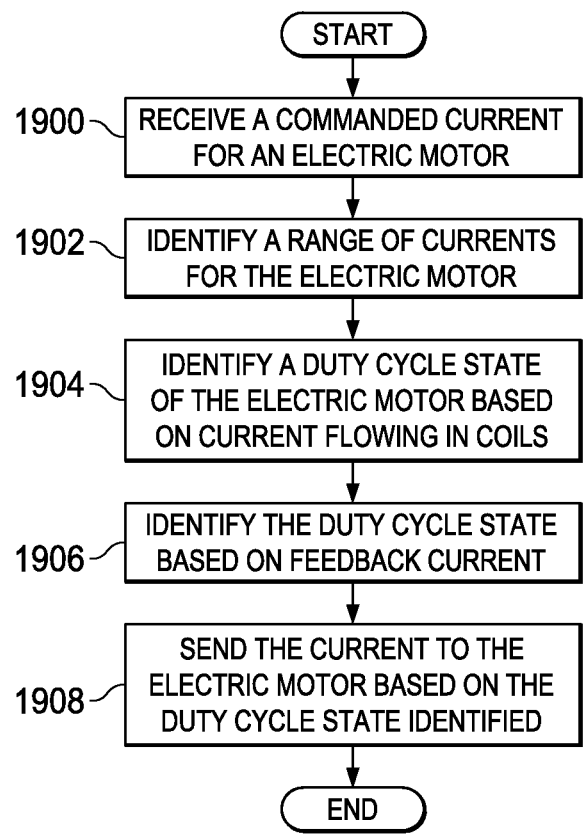
FIG. 19 is an illustration of a flowchart of a process for controlling the current sent to an electric motor in accordance with an illustrative embodiment.

With reference now to FIG. 19, an illustration of a flowchart of a process for controlling the current sent to an electric motor is depicted in accordance with an illustrative embodiment. The process illustrated FIG. 19 may be implemented in current controller 1300 in FIG. 13.

The process begins by receiving a commanded current for an electric motor (operation 1900). Thereafter, the process identifies a range of currents for the electric motor (operation 1902). The range may be defined by an upper limit and a lower limit. The commanded current is within the range in this illustrative example.

The process then identifies a duty cycle state of the electric motor based on current flowing in coils (operation 1904). The duty cycle state is identified based on feedback current (operation 1906). Feedback current is the current flowing in the coils of the electric motor in this illustrative example. The duty state also may be identified using at least one of the upper current limit and the lower current limit. The duty cycle state may be identified using a table such as table 1400 in FIG. 14.

The process sends the current to the electric motor based on the duty cycle state identified (operation 1908), with the process terminating thereafter. The current may be sent to the electric motor by generating switch commands that control switches in controller 108 that control the sending of current to the electric motor. The sending of the current to the electric motor may occur by the switches controlling the application of voltage across the coils. The current may be sent to one or more coils in the illustrative examples.

This process may be repeated during operation of the electric motor any number of times during the operation. This control of the current may provide for desired operation of the electric motor.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 20:
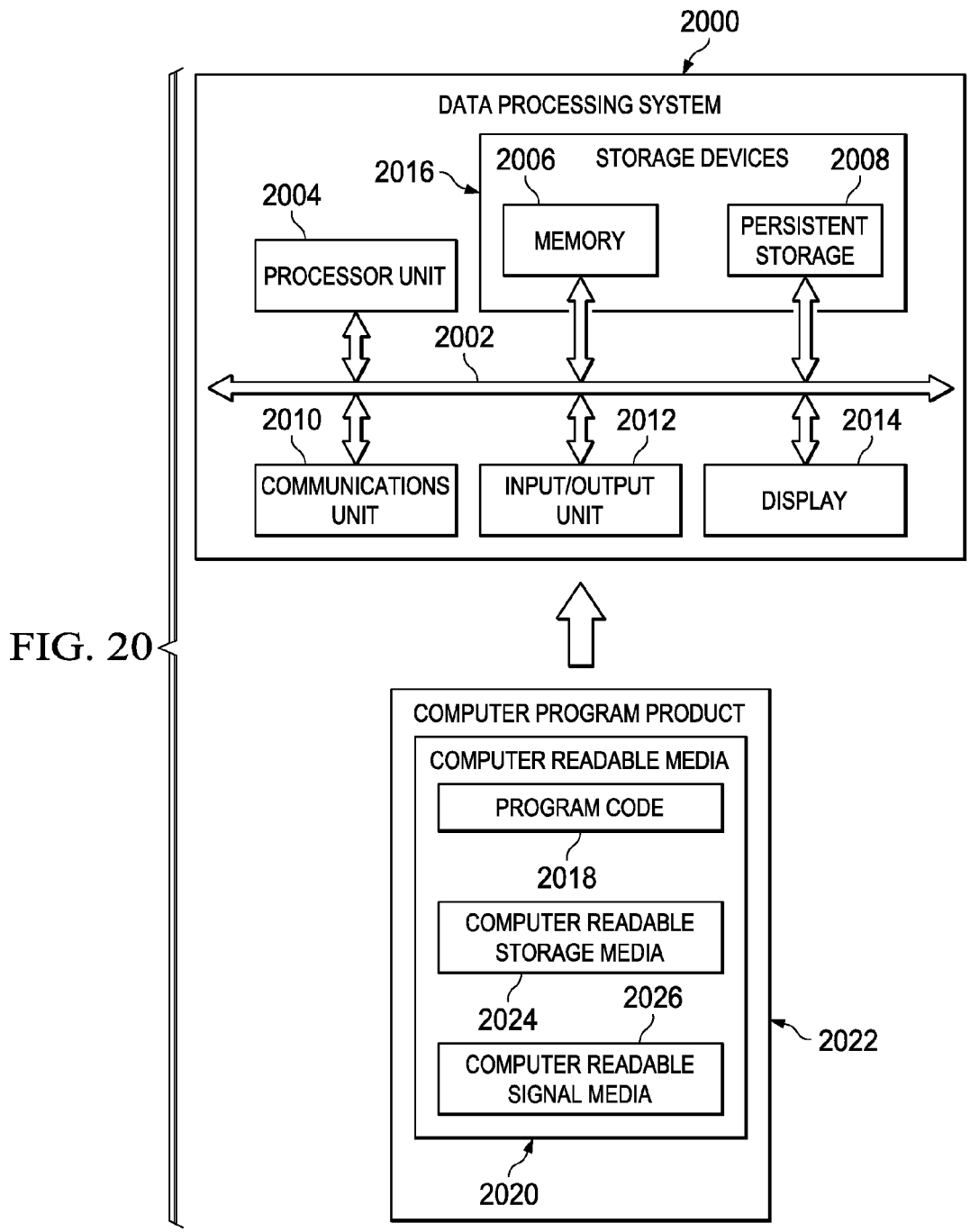
FIG. 20 is an illustration of a block diagram of a data processing system in accordance with an illustrative embodiment.

Turning now to FIG. 20, an illustration of a block diagram of a data processing system is depicted in accordance with an illustrative embodiment. Data processing system 2000 may be used to implement computer system 116 in FIG. 1. In this illustrative example, data processing system 2000 includes communications framework 2002, which provides communications between processor unit 2004, memory 2006, persistent storage 2008, communications unit 2010, input/output (I/O) unit 2012, and display 2014. In this example, communication framework may take the form of a bus system.

Processor unit 2004 serves to execute instructions for software that may be loaded into memory 2006. Processor unit 2004 may be a number of processors, a multi-processor core, or some other type of processor, depending on the particular implementation.

Memory 2006 and persistent storage 2008 are examples of storage devices 2016. A storage device is any piece of hardware that is capable of storing information, such as, for example, without limitation, data, program code in functional form, and/or other suitable information either on a temporary basis and/or a permanent basis. Storage devices 2016 may also be referred to as computer readable storage devices in these illustrative examples. Memory 2006, in these examples, may be, for example, a random access memory or any other suitable volatile or non-volatile storage device. Persistent storage 2008 may take various forms, depending on the particular implementation.

For example, persistent storage 2008 may contain one or more components or devices. For example, persistent storage 2008 may be a hard drive, a flash memory, a rewritable optical disk, a rewritable magnetic tape, or some combination of the above. The media used by persistent storage 2008 also may be removable. For example, a removable hard drive may be used for persistent storage 2008.

Communications unit 2010, in these illustrative examples, provides for communications with other data processing systems or devices. In these illustrative examples, communications unit 2010 is a network interface card.

Input/output unit 2012 allows for input and output of data with other devices that may be connected to data processing system 2000. For example, input/output unit 2012 may provide a connection for user input through a keyboard, a mouse, and/or some other suitable input device. Further, input/output unit 2012 may send output to a printer. Display 2014 provides a mechanism to display information to a user.

Instructions for the operating system, applications, and/or programs may be located in storage devices 2016, which are in communication with processor unit 2004 through communications framework 2002. The processes of the different embodiments may be performed by processor unit 2004 using computer-implemented instructions, which may be located in a memory, such as memory 2006.

These instructions are referred to as program code, computer usable program code, or computer readable program code that may be read and executed by a processor in processor unit 2004. The program code in the different embodiments may be embodied on different physical or computer readable storage media, such as memory 2006 or persistent storage 2008.

Program code 2018 is located in a functional form on computer readable media 2020 that is selectively removable and may be loaded onto or transferred to data processing system 2000 for execution by processor unit 2004. Program code 2018 and computer readable media 2020 form computer program product 2022 in these illustrative examples. In one example, computer readable media 2020 may be computer readable storage media 2024 or computer readable signal media 2026.

In these illustrative examples, computer readable storage media 2024 is a physical or tangible storage device used to store program code 2018 rather than a medium that propagates or transmits program code 2018.

Alternatively, program code 2018 may be transferred to data processing system 2000 using computer readable signal media 2026. Computer readable signal media 2026 may be, for example, a propagated data signal containing program code 2018. For example, computer readable signal media 2026 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 2000 are not meant to provide architectural limitations to the manner in which different embodiments may be implemented. The different illustrative embodiments may be implemented in a data processing system including components in addition to and/or in place of those illustrated for data processing system 2000. Other components shown in FIG. 20 can be varied from the illustrative examples shown. The different embodiments may be implemented using any hardware device or system capable of running program code 2018.

Illustrative embodiments of the disclosure may be described in the context of aircraft manufacturing and service method 2100 as shown in FIG. 21 and aircraft 2200 as shown in FIG. 22. Motors in group of electric motors 104 may be manufactured during various stages of manufacturing and service method 2100. Additionally, one or more of group of electric motors 104 may be used in manufacturing equipment. In still other examples, controller 108 may be integrated in group of electric motors 104 during maintenance or rework of group of electric motors 104.

Turning first to FIG. 21, an illustration of a block diagram of an aircraft manufacturing and service method is depicted in accordance with an illustrative embodiment. During pre-production, aircraft manufacturing and service method 2100 may include specification and design 2102 of aircraft 2200 in FIG. 22 and material procurement 2104.

During production, component and subassembly manufacturing 2106 and system integration 2108 of aircraft 2200 in FIG. 22 takes place. Thereafter, aircraft 2200 in FIG. 22 may go through certification and delivery 2110 in order to be placed in service 2112. While in service 2112 by a customer, aircraft 2200 in FIG. 22 is scheduled for routine maintenance and service 2114, which may include modification, reconfiguration, refurbishment, and other maintenance or service.

Each of the processes of aircraft manufacturing and service method 2100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 22, an illustration of a block diagram of an aircraft is depicted in which an illustrative embodiment may be implemented. In this example, aircraft 2200 is produced by aircraft manufacturing and service method 2100 in FIG. 21 and may include airframe 2202 with plurality of systems 2204 and interior 2206. Examples of systems 2204 include one or more of propulsion system 2208, electrical system 2210, hydraulic system 2212, and environmental system 2214. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 2100 in FIG. 21.

In one illustrative example, components or subassemblies produced in component and subassembly manufacturing 2106 in FIG. 21 may be fabricated or manufactured in a manner similar to components or subassemblies produced while aircraft 2200 is in service 2112 in FIG. 21. As yet another example, one or more apparatus embodiments, method embodiments, or a combination thereof may be utilized during production stages, such as component and subassembly manufacturing 2106 and system integration 2108 in FIG. 21. One or more apparatus embodiments, method embodiments, or a combination thereof may be utilized while aircraft 2200 is in service 2112 and/or during maintenance and service 2114 in FIG. 21. The use of a number of the different illustrative embodiments may substantially expedite the assembly of and/or reduce the cost of aircraft 2200.

Thus, the illustrative embodiments provide a method and apparatus for electric motors. The illustrative examples may be used to control an electric motor. Controller 108 may be designed such that it may provide more precise control of group of electric motors 104. For instance, controller 108 may control movement of group of electric motors 104 with a desired level of smoothness. Controller 108 also may control movement of group of electric motors 104 to be stepped in some illustrative examples.

In other examples, the control may be provided in one or more of four quadrants of operation for the electric motor. In still other examples, controller 108 may control more than one electric motor operating in tandem.

In this manner, controller 108 may provide four-quadrant control of one or more electric motors with a desired level of accuracy and efficiency. This desired level of accuracy may result in more accurate control of aircraft aero-control surfaces, more efficient control of aircraft propulsion systems, additional backup power for hydraulic motor systems, and increased smoothness in operation of reluctance motors, among other benefits.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other illustrative embodiments. For example, although the depicted examples are directed towards reluctance motors, other illustrative examples may be applied to other types of electric motors in which the position of a turning portion of the motor such as a rotor relative to coils, control of the movement of the rotor, or both is desired. For example, other illustrative embodiments may be applied to a brushless direct current motor. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a controller configured to identify a position of a disc relative to a plate with coils physically associated with the plate, and control a current sent to the coils based on the position of the disc, wherein the disc is configured to move such that a closest point between the disc and the plate changes along a periphery of the disc, wherein the controller comprises a normal vector calculator configured to identify a disc normal vector for the disc from inductance information and coil position information for the coils.

2. The apparatus of claim 1 further comprising:
a rotor having first teeth engaged with second teeth on the disc, wherein movement of the disc causes rotation of the rotor.

3. The apparatus of claim 2, wherein the disc and the plate with the coils form a motor and wherein the motor is configured to be connected to a device selected from one of an aerodynamic control surface, a propeller, and a wheel.

4. The apparatus of claim 1 further comprising:
a sensor system configured to generate information about the position of the disc.

5. The apparatus of claim 4, wherein the sensor system is comprised of at least one of an inductance sensor, an encoder, a Hall effect sensor, a laser range finder, a camera, a distance sensor, or a current sensor.

6. The apparatus of claim 1, wherein the controller is configured to identify the position of the disc relative to the plate with the coils physically associated with the plate based on inductance measured for the coils.

7. The apparatus of claim 1, wherein the controller further comprises:
a cross product generator configured to identify a vector from a cross product of the disc normal vector and a plate normal vector; and
a closest point identifier configured to identify an angle for the closest point from vector information received from the cross product generator, wherein the vector information is based on the vector.

8. The apparatus of claim 1, wherein the disc is a first disc, the plate is a first plate, the coils are first coils, the position is a first position, and the controller is further configured to identify a second position of a second disc relative to a second plate with second coils physically associated with the second plate and control the current sent to the second coils based on the second position of the second disc.

9. The apparatus of claim 1, wherein the disc moves with a nutating motion.

10. The apparatus of claim 1, wherein the disc and the plate form an electric motor selected from one of a reluctance motor, a variable reluctance motor, and a virtual ellipse device.

11. The apparatus of claim 1, wherein the controller is configured to identify a duty cycle state of an electric motor based on the current flowing in the coils and generate a current command to control the current sent to the coils within a range based on the duty cycle state of the electric motor.

12. The apparatus of claim 1 further comprising:
an electric motor comprising the disc, the plate, and the coils; and
a hydraulic motor system, wherein the controller is configured to control operation of the hydraulic motor system.

13. The apparatus of claim 1, wherein the controller, the disc, and the plate form an electric motor located in a platform selected from one of a mobile platform, a stationary platform, a land-based structure, an aquatic-based structure, a space-based structure, an aircraft, an unmanned aerial vehicle, drilling equipment, an electric crane, a windmill, a winch, a surface ship, a tank, a personnel carrier, a train, a spacecraft, a space station, a satellite, a submarine, an automobile, a power plant, a bridge, a dam, a house, a manufacturing facility, a building, a robot, a robotic arm, and an electric propulsion system.

14. An electric motor system comprising:
an electric motor having a plate with coils physically associated with the plate and a disc configured to move such that a closest point between the disc and the plate changes along a periphery of the disc; and
a controller configured to identify a position of the disc relative to the plate based on inductance measured for the coils and control a current sent to the coils based on the position of the disc, wherein the controller comprises a normal vector calculator configured to identify a disc normal vector for the disc from inductance information and coil position information for the coils.

15. The electric motor system of claim 14 further comprising:
a rotor having first teeth engaged with second teeth on the disc, wherein movement of the disc causes rotation of the rotor.

16. The electric motor system of claim 14 further comprising:
a sensor system configured to measure the inductance for the coils.

17. The electric motor system of claim 14, wherein the controller further comprises:
- a cross product generator configured to identify a vector from a cross product of the disc normal vector and a plate normal vector; and
- a closest point identifier configured to identify an angle for the closest point from vector information received from the cross product generator, wherein the vector information is based on the vector.

18. The electric motor system of claim 14, wherein the disc moves with a nutating motion.

19. A method for controlling operation of an electric motor, the method comprising:
- identifying a position of a disc relative to a plate with coils physically associated with the plate, wherein the identifying step comprises identifying a first normal vector for the disc based on inductance measured for the coils; and
- controlling a current sent to the coils based on the position of the disc, wherein the disc is configured to move such that a closest point between the disc and the plate changes along a periphery of the disc.

20. The method of claim 19, wherein the identifying step further comprises:
- generating a cross product of the first normal vector for the disc and a second normal vector for the plate; and
- identifying an angular position of the closest point of the disc relative to the plate based on the cross product of the first normal vector for the disc and the second normal vector for the plate.

21. The method of claim 19, wherein movement of the disc causes rotation of a rotor having first teeth engaged with second teeth on the disc.

22. The method of claim 21, wherein the rotor is connected to a device selected from one of an aerodynamic control surface, a propeller, and a wheel.

23. The method of claim 19, wherein a sensor system is configured to generate information about the position of the disc.

24. A system comprising:
- a hydraulic motor system;
- a reluctance motor system, wherein the reluctance motor system operates as a booster for the hydraulic motor system; and
- a controller associated with the electric motor, the controller configured to identify a position of a disc relative to a plate with coils physically associated with the plate and control a current sent to the coils based on the position of the disc, wherein the controller comprises a normal vector calculator configured to identify a disc normal vector for the disc from inductance information and coil position information for the coils.

25. An electric motor system comprising:
- a first controller associated with a first electric motor, the first controller configured to identify a position of a first disc relative to a first plate with first coils physically associated with the first plate and control a current sent to the first coils based on the position of the first disc, wherein the identifying step comprises identifying a first normal vector for the disc based on inductance measured for the coils; and
- a second controller associated with a second electric motor, the second controller configured to identify a position of a second disc relative to a second plate with second coils physically associated with the second plate and control a current sent to the second coils based on the position of the second disc, wherein the first controller and the second controller are configured to operate in parallel.

26. An electric motor system comprising:
- a controller configured to identify a position of a disc relative to a plate with coils physically associated with the plate and control a current sent to the coils based on the position of the disc, wherein the controller comprises a normal vector calculator configured to identify a disc normal vector for the disc from inductance information and coil position information for the coils; and
- an electric motor associated with the controller, wherein the controller is further configured to receive a commanded rotor arm position, identify a current rotor arm position, and generate a rate command for the disc.

* * * * *